United States Patent
Kojima et al.

(10) Patent No.: US 7,093,960 B2
(45) Date of Patent: Aug. 22, 2006

(54) ELECTRO-OPTICAL DEVICE ENCASED IN MOUNTING CASE, PROJECTION DISPLAY APPARATUS, AND MOUNTING CASE

(75) Inventors: Hiroyuki Kojima, Suwa (JP); Hiromi Saitoh, Chino (JP); Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 202 days.

(21) Appl. No.: 10/722,430

(22) Filed: Nov. 28, 2003

(65) Prior Publication Data

US 2004/0130897 A1    Jul. 8, 2004

(30) Foreign Application Priority Data

Dec. 20, 2002   (JP)   .............................. 2002-370076
Nov. 13, 2003   (JP)   .............................. 2003-384072

(51) Int. Cl.
*F21V 29/00*    (2006.01)
*G02F 1/1335*   (2006.01)
*H05K 7/20*     (2006.01)

(52) U.S. Cl. .......................... 362/294; 349/5; 349/58; 349/161; 361/703

(58) Field of Classification Search ................. 353/57, 353/60, 61; 349/5, 161; 362/294, 373; 361/694, 361/703
See application file for complete search history.

(56) References Cited

U.S. PATENT DOCUMENTS 5,076,543 A * 12/1991 Mandai ....................... 349/161
6,231,191 B1 * 5/2001 Shiraishi et al. ............... 353/61
6,290,360 B1 * 9/2001 Konuma et al. ............... 353/61
6,950,308 B1 * 9/2005 Saitoh et al. ................ 361/704
7,018,054 B1 * 3/2006 Miyashita et al. .......... 353/119

FOREIGN PATENT DOCUMENTS

| EP | 0 803 754 A1 | 10/1997 |
| JP | A-6-67143 | 3/1994 |
| JP | A 10-319381 | 12/1998 |
| JP | A-11-109871 | 4/1999 |
| JP | 2000-147472 A | 5/2000 |
| JP | A-2001-318361 | 11/2001 |
| JP | A 2002-107698 | 4/2002 |
| JP | A-2002-107698 | 4/2002 |
| JP | A-2004-45680 | 2/2004 |
| WO | WO98/36313 | 8/1998 |

* cited by examiner

*Primary Examiner*—Alan Cariaso
(74) *Attorney, Agent, or Firm*—Oliff & Berridge, PLC

(57) ABSTRACT

An electro-optical device cased in a mounting case includes an electro-optical device having an image display region on which projection light from a light source is incident, and a mounting case including a plate disposed to face one surface of the electro-optical device and a cover to cover the electro-optical device, a portion of the cover abutting against the plate, the mounting case accommodating the electro-optical device by holding at least a portion of a peripheral region located at the circumference of the image display region of the electro-optical device with at least one of the plate and the cover. In addition, the cover includes a cooling air introducing portion, and the cooling air introducing portion having a cooling air guiding portion to allow the cooling air which is blown to the electro-optical device encased in the mounting case to flow toward the image display region.

16 Claims, 16 Drawing Sheets

ELECTRO-OPTICAL DEVICE ENCASED IN MOUNTING CASE, PROJECTION DISPLAY APPARATUS, AND MOUNTING CASE

BACKGROUND OF THE INVENTION

1. Field of Invention

The present invention relates to a mounting case to accommodate an electro-optical device, such as a liquid crystal panel, which is used as a light valve of a projection display apparatus, such as a liquid crystal projector, an electro-optical device in the mounting case, in which the electro-optical device is accommodated or encased in the mounting case, and a projection display apparatus including the electro-optical device encased in the mounting case.

2. Description of Related Art

In the related art, generally, when a liquid crystal panel is used as a light valve of a liquid crystal projector, the liquid crystal panel is not provided in an exposed state on a console, etc., constituting the liquid crystal projector, but it is accommodated or encased in a suitable mounting case, and then the mounting case including the liquid crystal panel is provided on the console.

This is because the liquid crystal panel can be easily fixed and installed to the console by suitable screw holes provided in the mounting case.

In such a liquid crystal projector, source light emitted from a light source is projected on the liquid crystal panel in the mounting case as focused light. Light passed through the liquid crystal panel is enlarged and projected on the screen to display images. In this way, since enlarged projection is generally predetermined in such a liquid crystal projector, relatively intensive light emitted from a light source, such as a metal halide lamp is used.

However, in this construction, first, there is a problem in that the temperature of the liquid crystal panel encased in the mounting case rises. That is, the rise in temperature causes the rise in temperature of the liquid crystal interposed between a pair of transparent substrates in the liquid crystal panel. Therefore, the characteristics of the liquid crystal are deteriorated. In addition, when the light emitted from the source light is uneven, the liquid crystal panel is partially heated, and then the deviation of its transmittance is generated by the so-called hot spots. Thus, the quality of projected images deteriorates.

A technique for preventing the rise in temperature of the liquid crystal panel includes an approach for preventing the rise in temperature of the liquid crystal panel by providing a heat radiating sheet between a liquid crystal panel and a heat radiating plate in the liquid crystal display module including a case, which is referred as a "mounting case" in this specification, having the liquid crystal panel and the heat radiating plate for holding and accommodating the liquid crystal panel.

In addition, in order to address the problem, other approaches, such as an approach of providing a light shielding film on a substrate positioned at the side of the liquid crystal panel on which light is incident and an approach of forming the mounting case, in which the liquid crystal panel is held or accommodated, using a light reflective material, have been known.

However, the related art approaches to prevent the rise in temperature of the liquid crystal panel have the following problems. As long as intensive light is emitted from the light source, the problem of the rise in temperature of the liquid crystal panel may occur at any time. Therefore, in order to obtain still higher image quality, more effective measures to reduce or prevent the rise in temperature are required instead of or in addition to the aforementioned approaches.

For example, according to the approach of using the radiating sheet, the heat accumulated in the liquid crystal panel can be effectively radiated. However, assuming that the radiating sheet is provided to cover the entire surface of the substrate, the approach can be used for a reflective liquid crystal panel, but cannot be used for a transmissive liquid crystal panel.

In addition, according to the approach of reflecting light by the light shielding film and the mounting case, as the areas of the light shielding film and the mounting case increase, the amount of the reflected light increases. Thus, the rise in temperature of the liquid crystal panel can be surely reduced or prevented. However, if the amount of the reflected light increases indiscriminately, the stray light increases in the housing to accommodate the liquid crystal panel in the mounting case. Thus, the quality of images can be deteriorated. In addition, since the increase of the area of the light shielding film causes the reduction of the amount of the light from the source light, which is to be originally incident to and to pass through the liquid crystal panel, the image can be darkened. Thus, it is contrary to the aforementioned purpose in which the intensive light is used, in order to display a brighter image. Accordingly, the aforementioned related art approaches cannot be a total solution for the above problems.

SUMMARY OF THE INVENTION

The present invention is contrived to address the above problems and provides an electro-optical device encased in a mounting case capable of effectively suppressing the rise in temperature of the electro-optical device, to which relatively intensive light is incident, and a projection display apparatus including the electro-optical device encased in the mounting case. In addition, the present invention provides a mounting case suitable to mount the electro-optical device.

An electro-optical device in a mounting case according to an aspect of the present invention includes an electro-optical device having an image display region on which projection light from a light source is incident, and a mounting case which includes a plate disposed to face one surface of the electro-optical device and a cover to cover the electro-optical device, the cover having a portion which abuts against the plate, the mounting case accommodating the electro-optical device by holding at least a portion of a peripheral region located in the circumference of the image display region of the electro-optical device with at least one of the plate and the cover. In addition, the cover includes a cover main body to accommodate the electro-optical device and a cooling air introducing portion provided to be extended from or along the cover main body, and the cooling air introducing portion has a cooling air scattering prevention portion to circulate the cooling air which is blown to the electro-optical device encased in a mounting case toward the cover main body.

According to the electro-optical device encased in the mounting case of an aspect of the present invention having the image display region on which the projection light from the light source is incident, the electro-optical device is accommodated into the mounting case including the cover and the plate. The electro-optical device includes, for example, a liquid crystal device or a liquid crystal panel which is mounted as a light valve of the projection display apparatus. In addition, the mounting case may have a light shielding function to reduce or prevent the leakage of light in the peripheral region of the electro-optical device and the entry of influx of the stray light from the peripheral region to the image display region by covering at least a portion of the peripheral region of the electro-optical device.

In addition, particularly in an aspect of the present invention, the cover includes a cover main body and a cooling air introducing portion, and the cooling air introducing portion has a cooling air scattering prevention portion to allow the cooling air which is blown to the electro-optical device encased in a mounting case to flow toward the cover main body. Thus, it is possible to increase the heat radiating capability of the cover, and to effectively cool the electro-optical device. This is obtained as follows.

First, when projected light is incident on the electro-optical device, the temperature of the electro-optical device rises. Then, the heat generated in the electro-optical device is directly transferred to at least one of the plate and the cover holding the peripheral region, or the heat transferred to the plate is indirectly transferred to the cover through the abutting portion. In this case, the plate and the cover function as a heat sink of the electro-optical device.

In an aspect of the present invention, the cooling air is blown to the electro-optical device encased in a mounting case. For example, in a case that the electro-optical device encased in a mounting case is installed in a projection display apparatus, the cooling air can be blown by a cooling fan installed in the projection display apparatus. In addition, the cooling air introducing portion according to an aspect of the present invention has the aforementioned cooling air scattering prevention portion. Therefore, first, since the cooling air which is blown to the electro-optical device encased in a mounting case can be effectively circulated to the cover main body to accommodate the electro-optical device, the cooling of the electro-optical device itself can be effectively implemented. In addition, since this also means that the cooling of the cover can be effectively performed, the cover can more effectively function as the aforementioned heat sink.

As a result, according to an aspect of the present invention, the effective cooling of the electro-optical device can be realized. Therefore, in an aspect of the present invention, since trouble due to the rise in temperature of the electro-optical device, such as the deterioration of the characteristics of a liquid crystal layer constituting the electro-optical device or the occurrence of hot spots in the liquid crystal layer, do not occur, it is possible to display high-quality images.

In addition, a construction that the cooling air introducing portion is provided to be extended from the cover main body typically corresponds to the case that both portions are integrally constructed and the cooling air introducing portion is provided as an extending part of the cover main body. In addition, a construction that the cooling air introducing portion is extended along the cover main body typically corresponds to the case that both portions are constructed separately and the cooling air introducing portion is additionally attached to the cover main body.

In an aspect of the electro-optical device encased in a mounting case of the present invention, the cooling air scattering prevention portion includes a baffle plate.

According to the aspect, the cooling air scattering prevention portion includes the baffle plate. Herein, the baffle plate means a plate having a function to interrupt the circulation of the cooling air blown to the electro-optical device encased in a mounting case to a certain extent, and also, to allow the cooling air to circulate toward the cover main body by means of the interruption.

In the aspect, since the cooling air can be more effectively blown toward the cover main body by such a baffle plate, the cooling of the electro-optical device itself or the cooling of the cover can be more effectively performed.

In another aspect of the electro-optical device encased in a mounting case of the present invention, the cooling air introducing portion includes a slope portion having a pointed shape so that the tip of the cooling air introducing portion faces a direction of the flow of the cooling air, and the cooling air scattering prevention portion includes the slope portion.

According to the aspect, the cooling air scattering prevention portion includes the slope portion. Herein, the slope portion means a portion having a pointed shape whose tip faces the direction of the flow of the cooling air, as described above. According to the presence of the slope portion, the cooling air is typically considered to first reach the tip, and then flows up or down a surface constituting the slope portion to pass through the slope portion.

Herein, in a case where the tip or the slope portion is not provided, for example, in a case where a block type member having a predetermined thickness is provided in place of the slope portion or the like, the flow of the cooling air is interrupted by the block type member to a certain extent, and then the flow of the interrupted cooling air proceeds along the surface of the block type member. Therefore, the cooling air is difficult to be blown toward the cover main body.

In this way, by the "slope portion" referred in this aspect of the present invention, the function of the cooling air scattering prevention portion can be enhanced, and thus, the cooling of the electro-optical device itself or the cooling of the cover can be more effectively implemented.

The "pointed shape" referred in this aspect of the present invention includes a tapered shape, a wedge shape, a streamline shape, etc.

In another aspect of the electro-optical device encased in a mounting case of the present invention, the baffle plate is provided to surround a surface constituting the slope portion.

According to the aspect, the baffle plate is provided to surround the surface constituting the slope portion. Herein, the "surface constituting the slope portion" is typically considered to be a surface along which a cooling air flows up or down, in a case where the cooling air flows up or down as described above. In addition, in the aspect, the baffle plate is provided to surround the surface.

For example, according to the aspect, a phenomenon that where cooling air reaches the tip of the slope portion and flows up or down the surface as described above, can occur more frequently. Therefore, the cooling air can be more effectively discharged into the cover main body.

The expression "to surround" in the aspect includes various shapes and is affected by the specific shape of the baffle plate, the specific shape of the slope portion, and their combinations. For example, in a case where the slope portion has a shape of a triangular prism, which is a kind of the tapered shape, an aspect that the quadrilateral plates adhered to both bottoms of the triangular prism correspond to the baffles may be considered. In this case, if the area of the quadrilateral shape is larger than that of the bottoms, it seems as if the surplus portions of the quadrilateral shape were erected to be orthogonal to the side of the triangular prism. As a result, the side of the triangular prism, that is, a "surface constituting the slope portion" is surrounded by the surplus portions of the quadrilateral shape from both bottoms. In addition, if another plate corresponding to a "baffle plate" is provided to span between the quadrilateral plates adhered to both bottoms, it seems as if the plate and the quadrilateral plates completely surrounded the side of the triangular prism. The expression "to surround" in the aspect includes these shapes.

In another aspect of the electro-optical device encased in a mounting case of the present invention, the cover main body has a window to expose the image display region outside, and a surface of the image display region of the electro-optical device, which is exposed through the window, is continuous with a surface constituting the slope portion.

According to the aspect, since the window is provided in the cover main body, the projection light can be incident to the image display region of the electro-optical device.

In addition, particularly in the aspect, the surface of the image display region of the electro-optical device which is exposed through the window is continuous with the surface constituting the slope portion. Herein, the expression "surface constituting the slope portion" is typically considered to refer to the surface described above, that is, a surface where the cooling air flows up or down. In the aspect, this surface and the surface of the electro-optical device are "continuous" with one another. Therefore, the cooling air which flows up or down the surface constituting the slope portion is blown toward the surface of the electro-optical device almost without an interruption of flow at an end interface between the surfaces. As a result, the cooling of the electro-optical device itself can be more effectively performed than that of the aforementioned case.

The expression "continuous" includes, for example, a case that surfaces A and B of a square shape are not orthogonal to each other and one side of the surface A abuts on one side of the surface B. In addition, a case that the other surfaces C, D, . . . are positioned between the surfaces A and B and the aforementioned conditions are satisfied between these surfaces also belongs to the construction that the surfaces A and B are continuous with each other.

However, since the essence of the construction of "continuous" is to obtain the functions and effects that the flow of cooling air proceeds without interruption as described above, the verbatim application of the aforementioned definition cannot completely judge whether the construction is in the "continuous" range. For example, in term of the aforementioned reference numerals, in a case where a surface ζ is positioned between the surfaces A and B and the surfaces ζ and B are orthogonal, the surfaces A and B may be not continuous with each other. However, in a case where the surface ζ is a rectangular shape and its area is extremely smaller than those of the surfaces A and B, it is not considered that the cooling air blown through the surfaces A, ζ, and B is interrupted. Therefore, in this case, the surfaces A and B are also considered to be in the "continuous" range in the aspect.

In another aspect of the electro-optical device encased in a mounting case of the present invention, the edge of the window has a tapered shape.

According to the aspect, the surface constituting the slope portion, the surface constituting the image display region of the electro-optical device, and the surface constituting the edge of the window are considered to be the surfaces A, B, and c, respectively, so that the aforementioned "continuous" can be suitably realized.

Incidentally, for the purpose of reducing or preventing unnecessary light from being incident to the electro-optical device, it is preferable that the surface of the cover main body on which the window is provided and the aforementioned surface of the electro-optical device are not coplanar.

In this case, it is preferable that the surface of the electro-optical device is formed at a slightly recessed position from the surface of the cover main body on which the window is formed. From this point of view, the construction of the aspect may be preferable.

In addition, the angle of the "tapered shape" is preferably 15° or less. For example, assuming a specific case that the cooling air flows up the surface constituting the slope portion and flows down the surface constituting the "tapered portion" of the aspect to reach the surface of the electro-optical device, if the angle of the tapered shape is 15° or more, it is difficult for the cooling air once flowing up the surface constituting the slope portion to flow down a relatively steep slope and reach the surface of the electro-optical device. However, even if the angle of the tapered shape ranges from 15° or more to less than 90°, the surface of the edge of the window and the surface of the electro-optical device are in the "continuous" range.

In another aspect of the electro-optical device encased in a mounting case of the present invention, the cover further has a cooling air discharging portion to discharge the cooling air blown from the cover main body toward the cover, and the cooling air discharging portion has a first surface-area increasing portion to increase the surface-area thereof.

According to the aspect, the cover includes the cooling air discharging portion corresponding to the aforementioned cooling air introducing portion, and the cooling air discharging portion has the first surface-area increasing portion. As a result, the heat radiating capability or the cooling capability of the cover can be enhanced. Therefore, since the cover can be substantially always maintained in a suitably cooled state, the cooling of the electro-optical device can be very effectively performed.

In another aspect of the electro-optical device encased in a mounting case of the present invention, the cover has a side wall portion facing the side of the electro-optical device in the cover main body, and the side wall portion has a second surface-area increasing portion to increase the surface-area thereof.

According to the aspect, since the cover is provided with the side wall portion and the side wall portion is provided with the second surface-area increasing portion, the heat radiating capability or the cooling capability of the cover can be enhanced. Therefore, since the cover can be substantially always maintained in a suitably cooled state, the cooling of the electro-optical device can be very effectively performed. In addition, since the sidewall portion faces the side of the electro-optical device, an occupation ratio of the sidewall portion over the entire cover is originally large. In the aspect, since the sidewall portion occupying relatively large area of the entire area of the cover is provided with the second surface-area increasing portion, it is possible to further effectively increase the entire area of the cover.

In another aspect of the electro-optical device encased in a mounting case of the present invention, the cooling air introducing portion includes a baffle portion to blow the cooling air to the side wall portion, and the cooling air scattering prevention portion includes the baffle portion.

According to the aspect, the baffle portion allows the cooling air to flow toward the side wall portion, the baffle portion being formed in the cooling air introducing portion and the cooling air scattering prevention portion. As a result, the function and effect of the second surface-area increasing portion provided in the side wall portion can be more effectively obtained.

In another aspect of the electro-optical device encased in a mounting case of the present invention, at least one of the first surface-area increasing portion and the second surface-area increasing portion includes fins formed to be protruded from the surface of the cover and/or dimples formed to form recesses on the surface of the cover.

According to the aspect, the surface area of the cover can be relatively easily increased.

"The fins" described in the aspect may be formed by a process, such as a cutting process, a forging process, a pressing process, an injection molding process, or a casting process when the cover main body is formed or thereafter.

In addition, the difference between the "dimple" and "the fin" is determined whether they are protruded or concaved from "the surface of the cover" as a reference surface.

In some cases, "the dimple" referred in the aspect may have a property that "it never interrupts the flow of the cooling air blown to the electro-optical device encased in the mounting device". From this point of view, based on the understanding that the fins have a property to interrupt the flow of the cooling air a little, it is possible to determine the difference between the dimple and the fin.

In addition, in the aspect, the expression "to form a concave" does not mean that a process of "forming the concave" is actually performed when actually forming the dimple on the surface of the cover. As a method of forming the dimple, likewise the method of forming fins, the dimples can be formed by a process, such as a cutting process, a forging process, a pressing process, an injection molding process, or a casting process when the cover main body is formed or thereafter.

In another aspect of the electro-optical device cased in the mounting case of the present invention, the fins are provided to correspond to the direction of the flow of cooling air.

According to the aspect, since the fins are provided to correspond to the direction of the flow of cooling air blown to the electro-optical device encased in the mounting case, the cooling effect on the cover by the fins can be more effectively enhanced.

In other words, if the fins are provided to interrupt the flow of cooling air, it is difficult for the cooling air to be blown beyond the fins, so that the cover cannot be effectively cooled. However, if the fins are formed to correspond to the direction of the flow of cooling air, the fins do not stop the flow of cooling air, so that the cooling air can be blown over the entire cover uniformly. Thus, according to the aspect, the cooling effect on the cover can be effectively enhanced.

In the aspect, the construction that "the fins are provided to follow the direction of the flow of cooling air" specifically includes the following cases. For example, the first case is that, when the cooling air linearly flows around the cover, the fins are formed to follow the direction of the flow of cooling air. The second case is that, when the cooling air flows in whirls around the cover, the fins are provided to change their directions according to the positions of the fins provided on the cover. In addition to the cases, the construction includes another case that, even if the cooling air flows in rather irregular directions around the electro-optical device encased in the mounting case, the fins are provided to change their directions so as to follow all or a portion of the directions of irregular flow according to the positions of the fins provided on the cover.

In another aspect of the electro-optical device encased in the mounting case of the present invention, the fins includes a first column of fins and a second column of fins extended in parallel to the first column of fins, and a gap between the first column of fins and the second column of fins is 1 mm or more.

According to the aspect, the fins include the first column of fins and the second column of fins. Herein, more specifically, for example, "the first column of fins" and "the second column of fins" are considered to correspond to fins which are extended in a relatively long straight shape.

In addition, in the aspect, the gap between the two columns of fins is 1 mm or more. As a result, the cooling air, which is blown to the electro-optical device encased in the mounting case, can be also supplied between the two columns of fins uniformly without any difficulty.

In particular, assuming that the electro-optical device encased in the mounting device of the present invention is mounted to a projection display apparatus, the electro-optical device encased in the mounting case and a cooling fan individually provided to the projection display apparatus have to be provided at a long distance, or it is difficult that both of them are arranged to be opposite to each other since additional components are provided to the projection display apparatus. In this case, it is considered that only the cooling air having a low static pressure and a low amount are blown to the electro-optical device encased in the mounting case.

In the aspect, since the gap between the two columns of fins is set to a relatively long distance of 1 mm or more as described above, the cooling air having a low static pressure and a low air volume can be supplied between the two columns of fins. By doing so, since the surface area of the fins which are exposed to the cooling air is increased, the heat radiating property of the fins can be more enhanced.

Therefore, according to the aspect, it is possible to further enhance the heat radiating capability of the entire cover.

In another aspect of the electro-optical device encased in the mounting case of the present invention, the cover is made of a material having a high heat conductivity.

According to the aspect, since the cover is made of the material having a high heat conductivity, the heat radiating capability of the cover can be highly enhanced along with the function and effect due to the cooling air scattering prevention portion, the first and the second surface-area increasing portions, and the like.

To be specific, "the material having a high heat conductivity" preferably includes aluminum, magnesium, copper, or their alloys.

In order to achieve the above, another aspect of an electro-optical device encased in a mounting case according to the present invention includes an electro-optical device having an image display region on which projection light from a light source is incident, and a mounting case including a plate disposed to face one surface of the electro-optical device and a cover to cover the electro-optical device, the cover having a portion which abuts against the plate, the mounting case accommodating the electro-optical device by holding at least a portion of a peripheral region located in the circumference of the image display region of the electro-optical device with at least one of the plate and the cover. In addition, the cover includes a cover main body and a cooling air introducing portion, and the cooling air introducing portion has a slope portion having a pointed shape.

According to the aspect, the substantially same function and effect, as the electro-optical device encased in a mounting case including the slope portion, can be obtained.

An another electro-optical device cased in the mounting case, according to the present invention, includes an electro-optical device having an image display region on which projection light from a light source is incident, and a mounting case including a plate disposed to face one surface of the electro-optical device and a cover to cover the electro-optical device, a portion of the cover abutting against the plate, wherein the mounting case accommodates the electro-optical device by holding at least a portion of a peripheral region located at the circumference of the image display region of the electro-optical device with at least one of the plate and the cover. In addition, the cover includes a cooling air introducing portion, and the cooling air introducing portion has a cooling air guiding portion to allow the cooling air which is blown to the electro-optical device encased in a mounting case to flow toward the image display region.

In order to address the problems, a mounting case of an aspect of the present invention includes a plate disposed to face one surface of the electro-optical device having an image display region on which projection light from a light source is incident and a cover to cover the electro-optical device, the cover having a portion which abuts against the plate, the mounting case accommodating the electro-optical device by holding at least a portion of a peripheral region located in the circumference of the image display region of the electro-optical device with at least one of the plate and the cover. In addition, the cover includes a cover main body and a cooling air introducing portion, and the cooling air introducing portion has a cooling air scattering prevention portion to allow the cooling air which is blown to the electro-optical device encased in a mounting case to flow toward the cover main body.

According to the mounting case of an aspect of the present invention, it is possible to provide a mounting case suitable for the electro-optical device encased in the mounting case of an aspect of the present invention.

In order to address the problems, a projection display apparatus of the present invention includes the aforementioned electro-optical device encased in the mounting case (including their various aspects); the light source; an optical system to guide the light emitted from the light source into the electro-optical device; a projection optical system to project the light emitted from the electro-optical device; and a cooling air discharging portion to supply cooling air to the electro-optical device encased in the mounting case.

According to the projection display apparatus of an aspect of the present invention, since it includes the aforementioned electro-optical device encased in the mounting case of an aspect of the present invention, and the electro-optical device can be effectively cooled by the cooling air scattering prevention portion and the cooling air discharging portion provided in the projection display apparatus, it is possible to display much higher quality of images.

The operations and other advantages of the present invention will be apparent from the exemplary embodiments to be described later.

DETAILED DESCRIPTION OF PREFERRED EMBODIMENTS

Now, exemplary embodiments of the present invention will be described with reference to the accompanying figures.

An Exemplary Embodiment of a Projection Liquid Crystal Apparatus

First, with reference to FIG. 1, an exemplary embodiment of a projection liquid crystal apparatus according to the present invention will be described on the basis of an optical system which is assembled in optical units. The projection display apparatus of the exemplary embodiment is constructed into a multi-plate color projector having three liquid light valves, the liquid light valve being an example of an electro-optical device encased in a mounting case.

Figure 1:
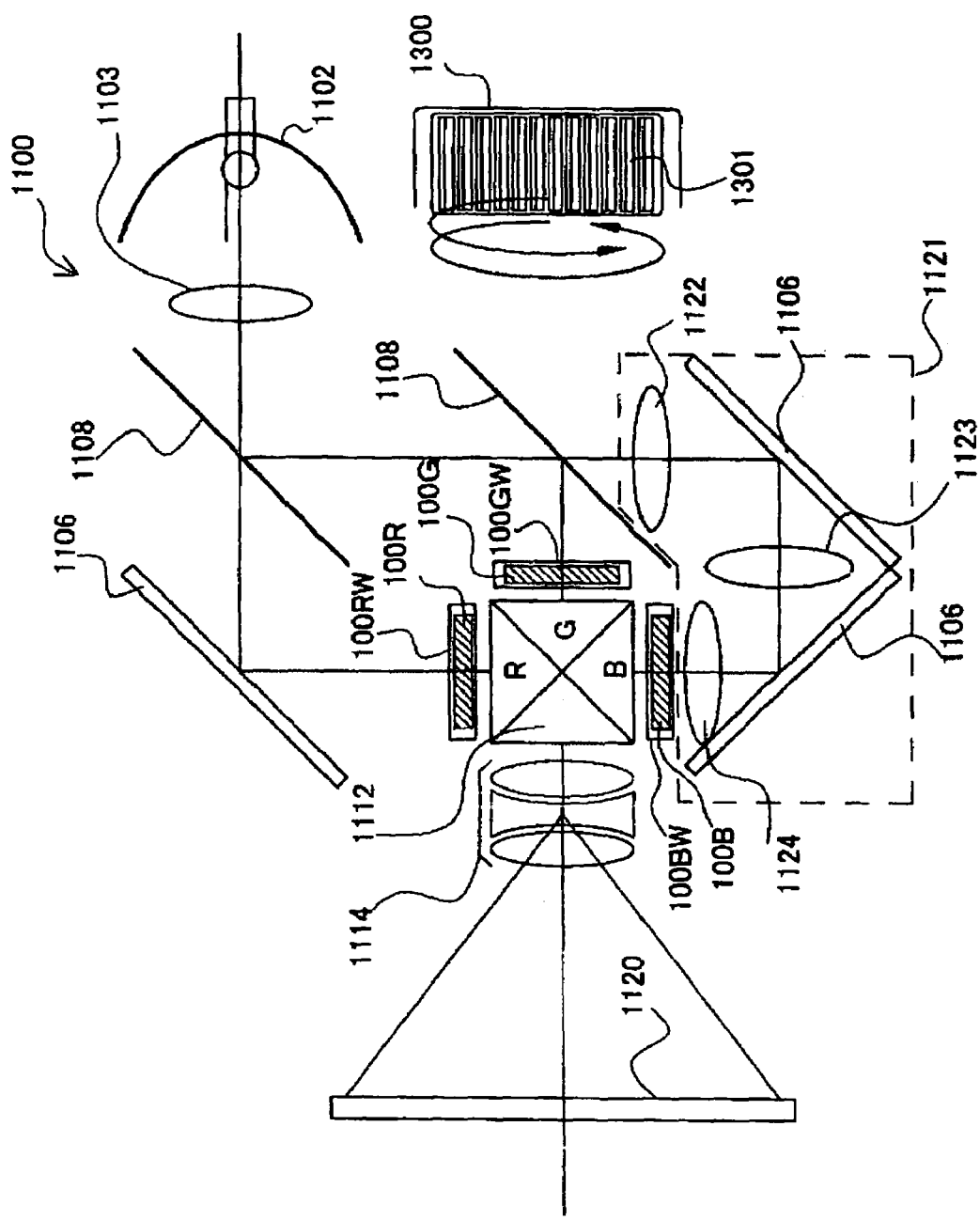
FIG. 1 is a plan view illustrating an exemplary embodiment of a projection liquid crystal apparatus according to the present invention.

In FIG. 1, a liquid crystal projector 1100, an example of the multi-plate color projector according to the exemplary embodiment of the invention, is a projector which includes three liquid light valves each having an electro-optical device in which a driving circuit is mounted on a TFT array substrate as RGB light valves 100R, 100G, and 100B.

In the liquid crystal projector 1100, the light emitted from a lamp unit 1102, which is a white light source, such as a metal halide lamp, is divided into R, G, and B light components corresponding to three primary colors R, G, and B by three mirrors 1106 and two dichroic mirrors 1108, and the light components are guided into the light valves 100R, 100G, and 100B corresponding to the respective colors. In this case, the B light component is particularly guided through a relay lens system 1121 including an incident lens 1122, a relay lens 1123, and an emitting lens 1124 in order to reduce or prevent the loss of light due to its long optical path. The light components corresponding to the three primary colors, which are modulated by the light valves 100R, 100G, and 100B, are synthesized by a dichroic prism 1112 and then projected on a screen 1120 as a color image through a projection lens 1114.

An active matrix driving liquid crystal device as described later, in which TFTs are used as switching devices, for example, is used as the light valves 100R, 100G, and 100B of the exemplary embodiment. The light valves 100R, 100G, and 100B are constructed as the electro-optical devices encased in the mounting cases as described later in detail.

As shown in FIG. 1, a fan 1300 (which corresponds to an example of "the cooling air discharging portion" as referred in an aspect of the present invention) is provided in the liquid projector 1100 to supply cooling air to the light valves 100R, 100G, and 100B. The fan 1300 includes a substantially cylindrical member having a plurality of blades 1301 on the side thereof, and the cylindrical member rotates around its axis to cause the blades 1301 to generate wind. In accordance with such a principle, the wind generated by the fan 1300 flows in whirls as shown in FIG. 1.

The wind is supplied to the respective light valves 100R 100G, and 100B through air passage not shown in FIG. 1, and blown toward the light valves 100R, 100G, and 100B from respective outlets 100RW, 100GW, and 100BW provided near the light valves 100R, 100G, and 100B.

Incidentally, by using the fan 1300 as described above, it is possible to obtain an advantage that the wind is easily supplied to narrow spaces around the light valves 100R, 100G, and 100B because the wind has a high static pressure.

In the aforementioned construction, the light emitted from the lamp unit 1102, which is an intensive light source, raises the temperatures of the light valves 100R, 100G, and 100B. At that time, if the temperatures rise excessively, the liquid crystal constituting the light valves 100R, 100G, and 100B may be deteriorated, or hot spots generated by the partial heating of the liquid crystal panel, due to the unevenness of light emitted from the light source, may cause the deviation of its transmittance. For this reason, particularly in the exemplary embodiment, mounting cases capable of cooling the electro-optical devices are provided in the respective light valves 100R, 100G, and 100B as described later. Therefore, it is possible to effectively suppress the temperature rise of the light valves 100R, 100G, and 100B as described later.

In the exemplary embodiment, it is preferable that a cooling device including a circulating unit to circulate a coolant through the surrounding spaces of the light valves 100R, 100G, and 100B is provided within a housing of the liquid crystal projector 1100. This makes it possible to further effectively cool the electro-optical device encased in the mounting case having a heat radiating function as described later.

An Exemplary Embodiment of an Electro-Optical Device

Figure 2:
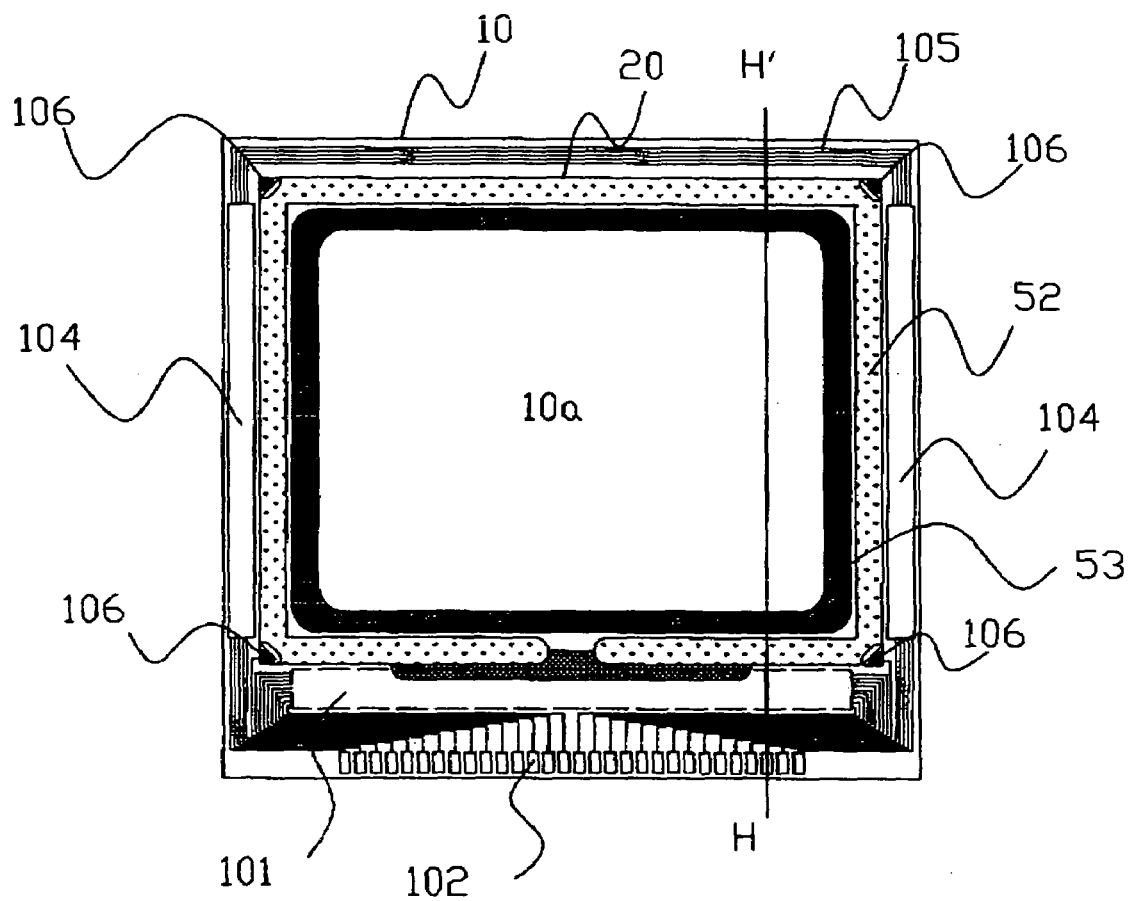
FIG. 2 is a plan view illustrating an exemplary embodiment of an electro-optical device according to the present invention.
Figure 3:
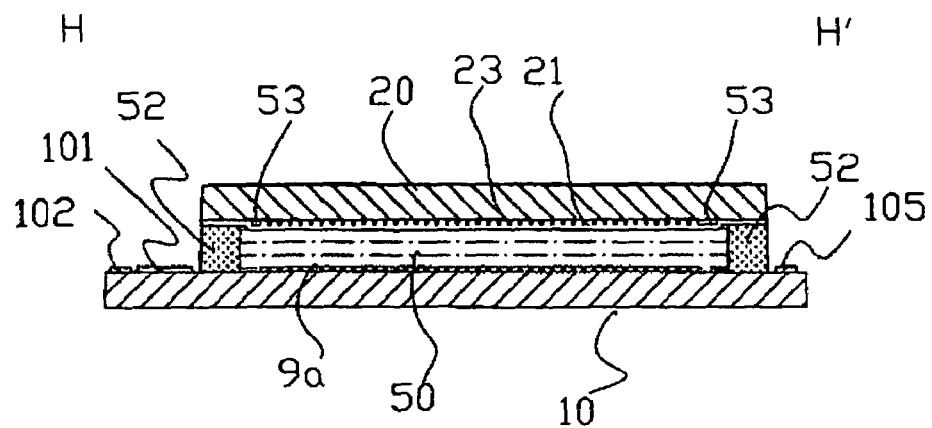
FIG. 3 is a cross-sectional view taken along the plane H–H" shown in FIG. 2.

Next, the overall construction of an electro-optical device according to an exemplary embodiment of the present invention will be described with reference to FIGS. 2 and 3. Herein, a driving circuit built-in TFT active driving liquid crystal device is illustrated as an example of an electro-optical device. The electro-optical device according to the exemplary embodiment is used as the liquid light valves 100R, 100G, and 100B of the aforementioned liquid crystal projector 1100. Herein, FIG. 2 is a plan view of the electro-optical device and illustrates a TFT array substrate and constructional components provided thereon as seen from a counter substrate. FIG. 3 is a cross-sectional view taken along the plane H–H" shown in FIG. 2.

Referring to FIGS. 2 and 3, in the electro-optical device according to the exemplary embodiment, the TFT array substrate 10 is disposed to face the counter substrate 20. A liquid crystal layer 50 is sealed between the TFT array substrate 10 and the counter substrate 20. The TFT array substrate 10 and the counter substrate 20 are bonded to each other by a seal member 52 disposed at a seal region which is positioned around an image display region 10a.

The seal member 52 to bond both substrates is made of, for example, ultra-violet curable resin, thermosetting resin, and the like, which is applied on the TFT array substrate 10 in a manufacturing process and then cured by ultra-violet irradiation or heating. In addition, spacers, such as glass fiber or glass bead, are dispersed in the seal member 52 to keep the gap between the TFT array substrate 10 and the counter substrate 20 (the gap between the substrates) at a predetermined value. That is, the electro-optical device of the exemplary embodiment is small in size and suitably used as a light valve of the projector to enlarge and displaying images.

A frame light shielding film 53 having a light shielding property and to define a frame region of the image display region 10a is provided on the counter substrate 20 parallel to the inner side of the seal region where the seal member 52 is disposed. All or a portion of the frame light shielding film 53 may be provided on the TFT array substrate 10 as a built-in light shielding film.

In the peripheral region positioned at the outer side of the seal region, where the seal member 52 is disposed, out of a region extending to the circumference of the image display region, a data line driving circuit 101 and an external circuit connection terminal 102 are provided along one side of the TFT array substrate 10, and scanning line driving circuits 104 are provided along two sides adjacent to the one side thereof. Furthermore, a plurality of wiring lines 105 to connect the scanning line driving circuits 104 provided along two sides of the image display region 10a are provided at the remaining side of the TFT array substrate 10. As shown in FIG. 2, upper and lower conducting members 106 to serve as upper and lower conduction terminals between the two substrates are disposed at four corners of the counter substrate 20. On the other hand, on the TFT array substrate 10, the upper and lower conduction terminals are provided at the regions opposite to the corners. Through these members, the electrical conduction is made between the TFT array substrate 10 and the counter substrate 20.

In FIG. 3, pixel-switching TFTs and wiring lines, such as scanning lines and data lines, are formed on the TFT array substrate 10, and then, an alignment layer is formed on a pixel electrode 9a. On the other hand, on the counter substrate 20, a counter electrode 21 and light shielding films 23 of a lattice or stripe shape are provided, and in addition, an alignment layer is formed on the uppermost portion thereof. A liquid crystal layer 50, which is made of, for example, one kind of nematic liquid crystal or a mixture of plural kinds of nematic liquid crystal, takes a predetermined alignment state between the pair of alignment layers.

In addition to the data line driving circuit 101 and the scanning line driving circuits 104, etc., a sampling circuit to sample image signals on image signal lines and to supply the sampled image signals to data lines, a precharge circuit to supply the precharge signals of a predetermined level to a plurality of data lines prior to the image signals, and an test circuit and the like to test the quality and defects of the electro-optical device during the manufacturing process or at the time of forwarding may be formed on the TFT array substrate 10 shown in FIGS. 2 and 3.

When the electro-optical device as constructed above is operated, intensive light is radiated from the upper side of FIG. 3. As a result, the temperature of the electro-optical device rises by the heating due to the light absorption in the counter substrate 20, the liquid crystal layer 50, and the TFT array substrate 10, etc. The rise in temperature facilitates the deterioration of the liquid crystal layers 50 and causes the deterioration of the quality of the display image.

Therefore, in the exemplary embodiment, the rise in temperature is effectively suppressed by an electro-optical device encased in a mounting case as described below.

An Electro-Optical Device Encased in a Mounting Case

First Exemplary Embodiment

Next, an electro-optical device encased in a mounting case according to a first exemplary embodiment of the present invention will be described with reference to FIGS. 4 to 14.

Figure 4:
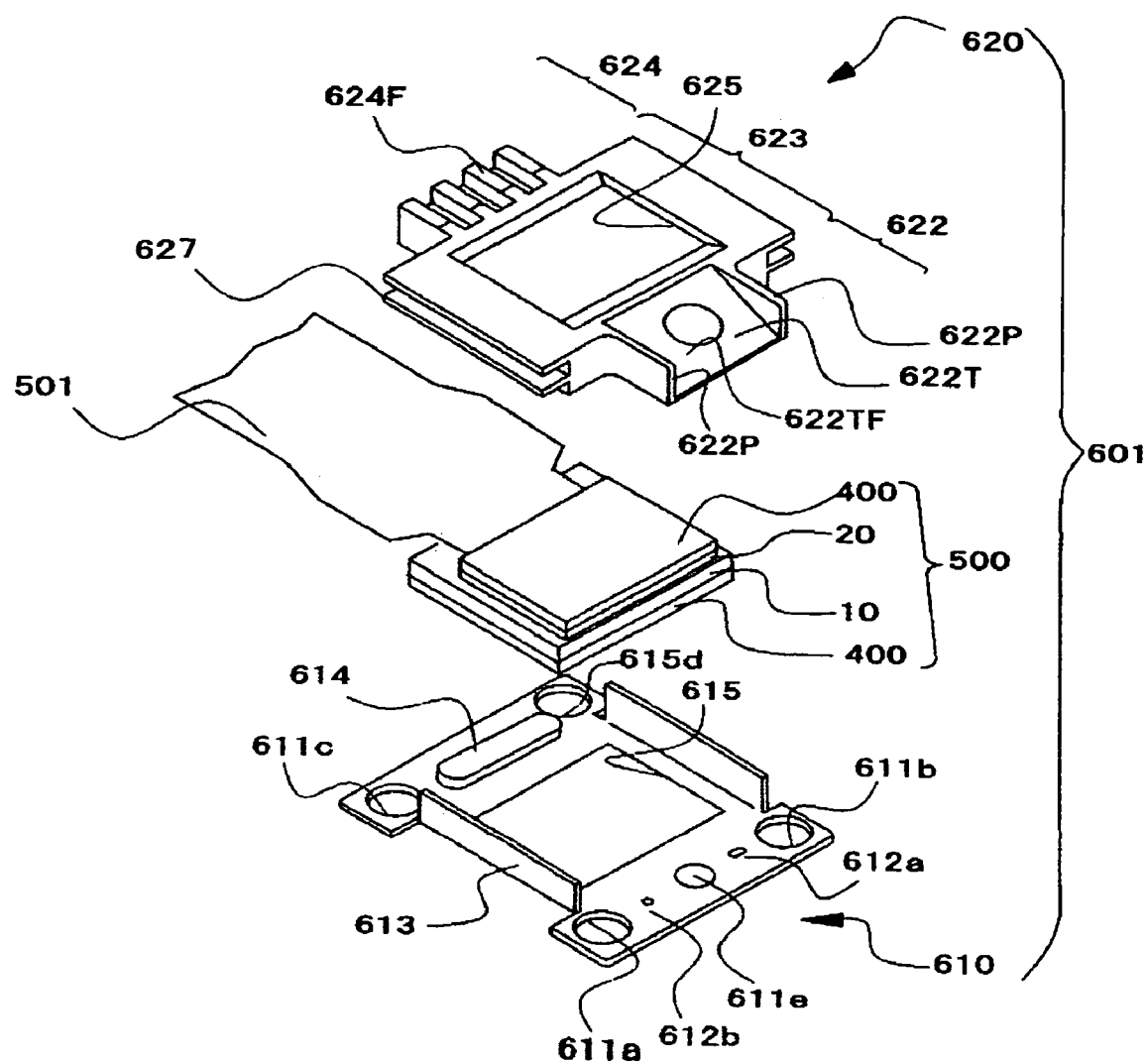
FIG. 4 is an exploded perspective view illustrating a mounting case according to a first exemplary embodiment of the present invention together with an electro-optical device.
Figure 5:
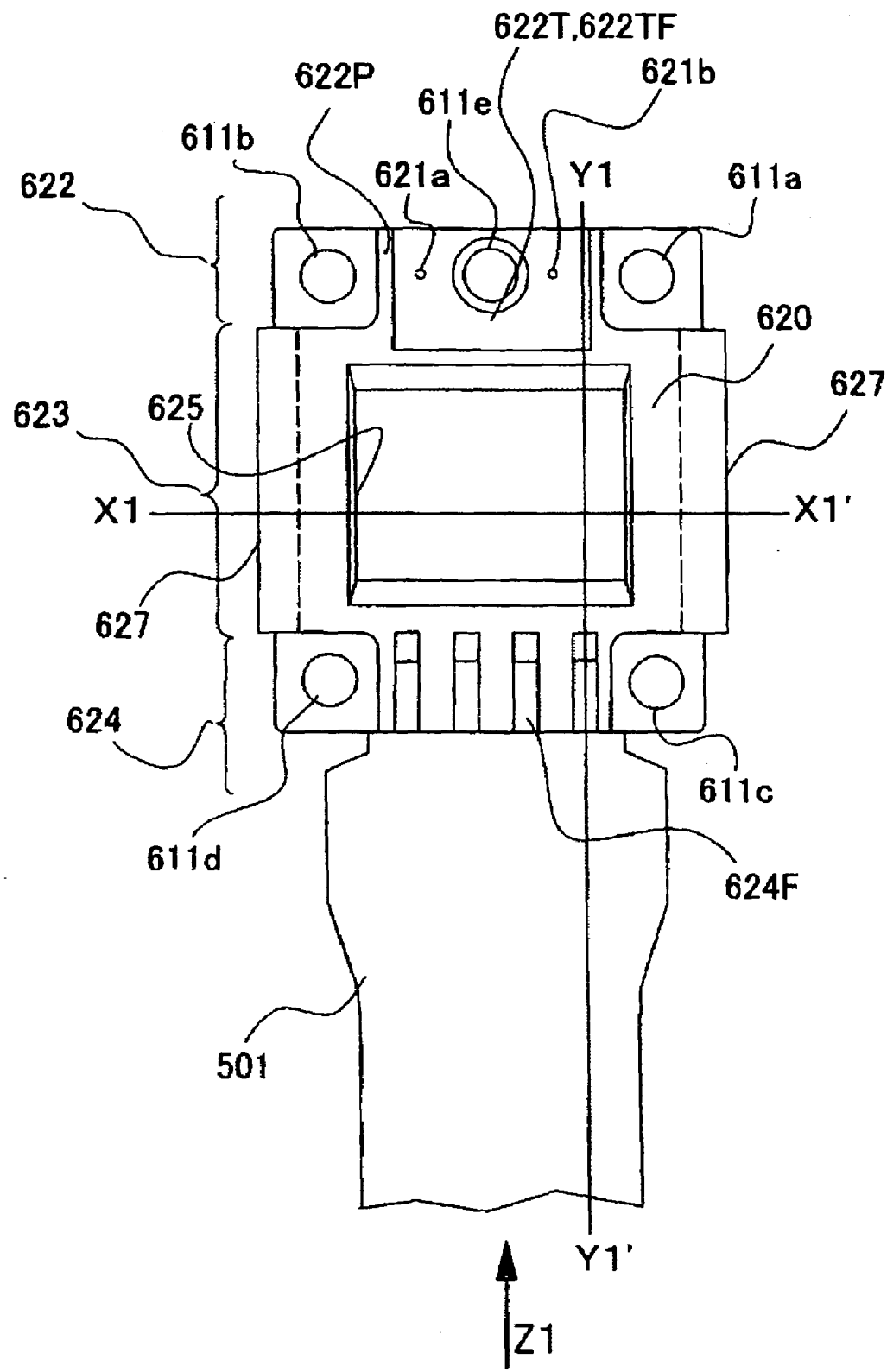
FIG. 5 is a front view of an electro-optical device encased in the mounting case according to the first exemplary embodiment of the present invention.
Figure 6:
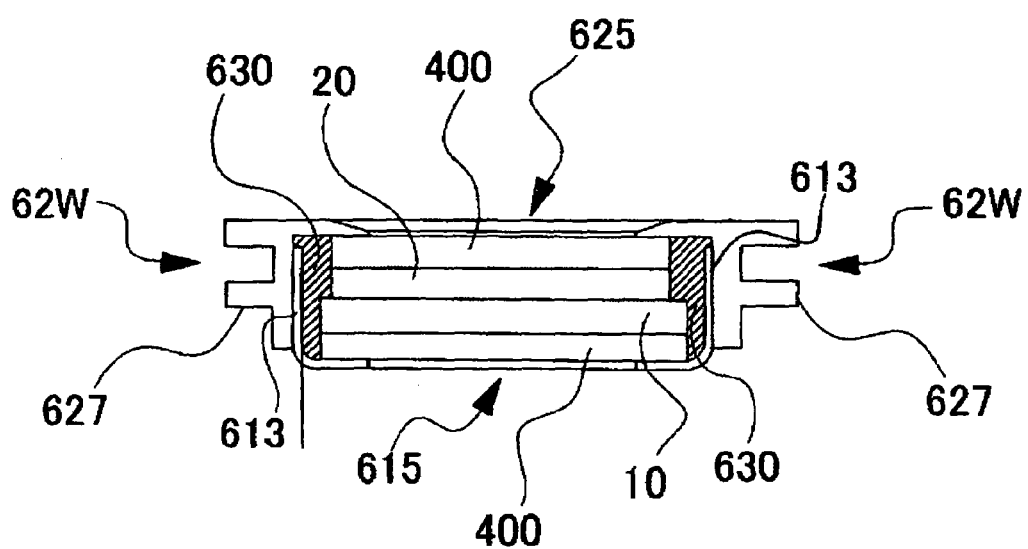
FIG. 6 is a cross-sectional view taken along the plane X1–X1" shown in FIG. 5.
Figure 7:
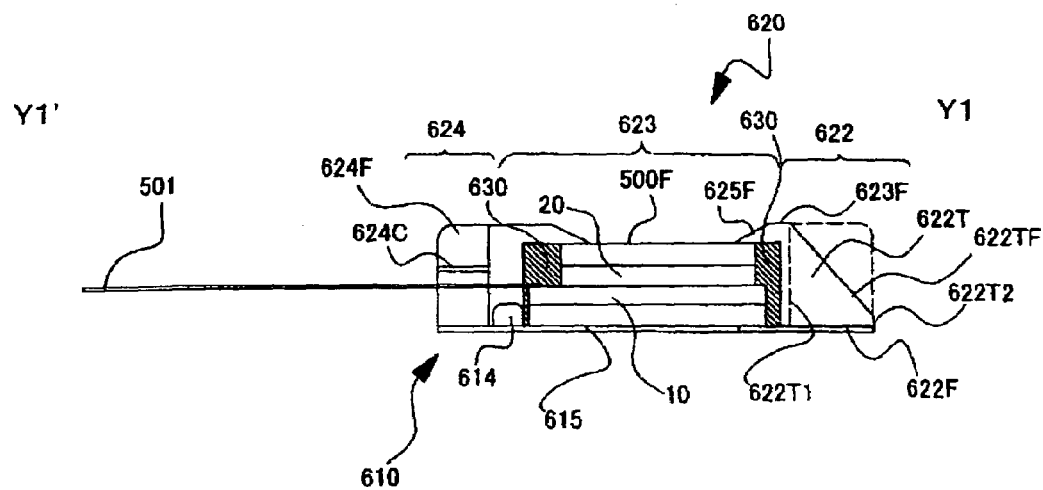
FIG. 7 is a cross-sectional view taken along the plane Y1–Y1" shown in FIG. 5.
Figure 8:
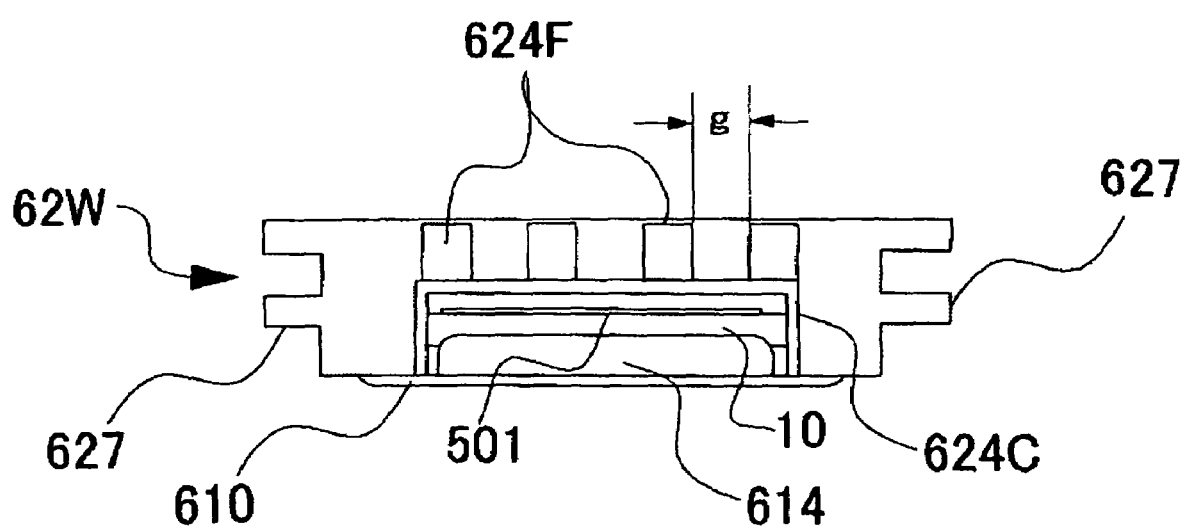
FIG. 8 is a back view seen from the direction of Z1 shown in FIG. 5.
Figure 9:
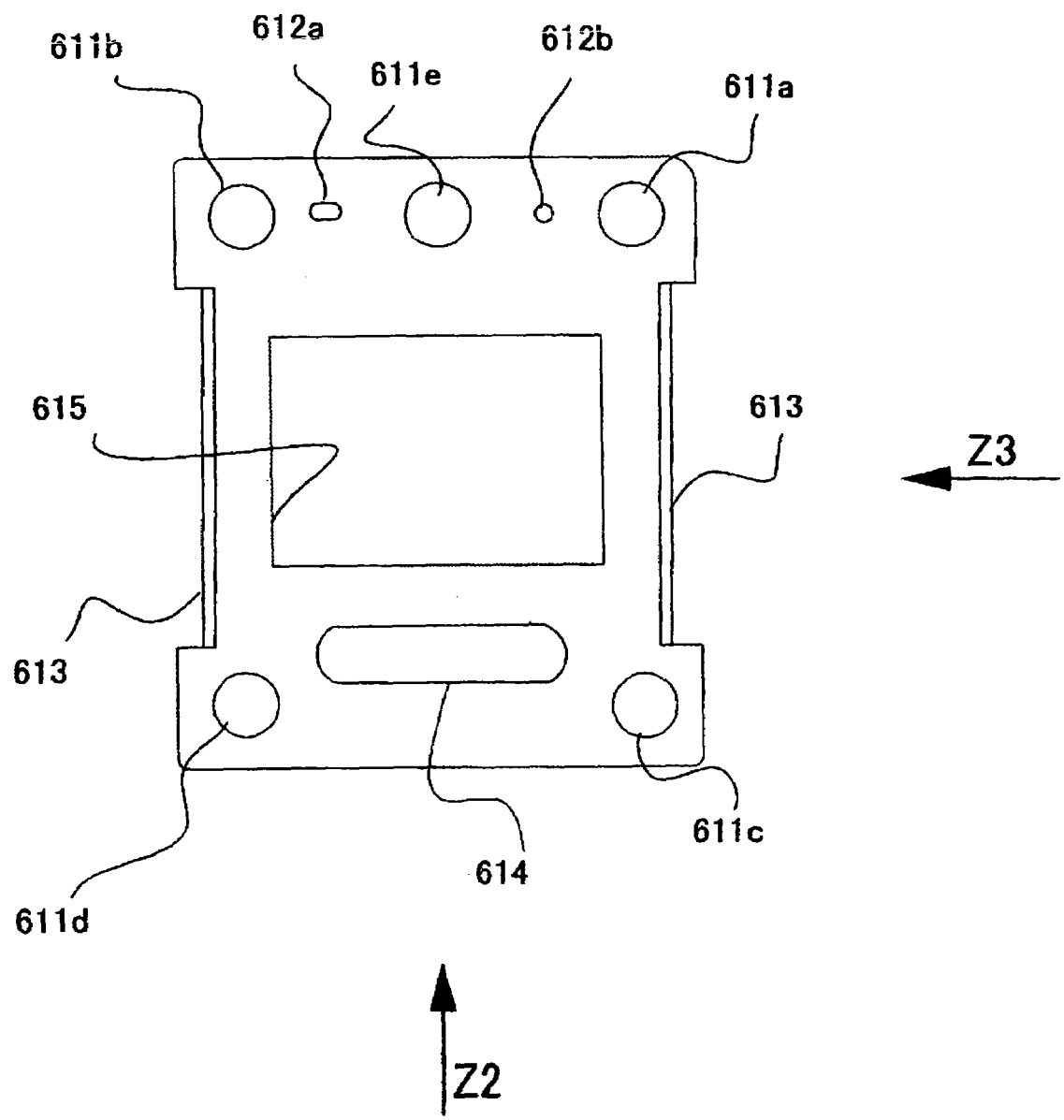
FIG. 9 is a front view of a plate member constituting the mounting case according to the first exemplary embodiment of the present invention.
Figure 10:
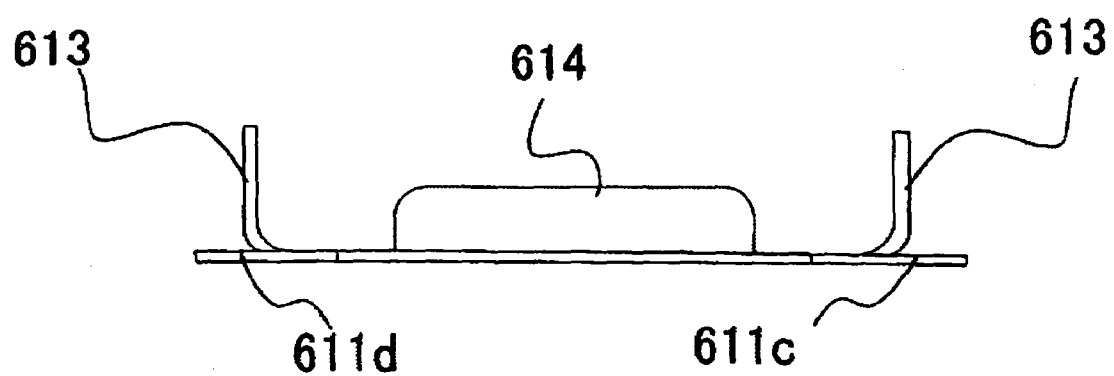
FIG. 10 is a back view seen from the direction of Z2 shown in FIG. 9.
Figure 11:
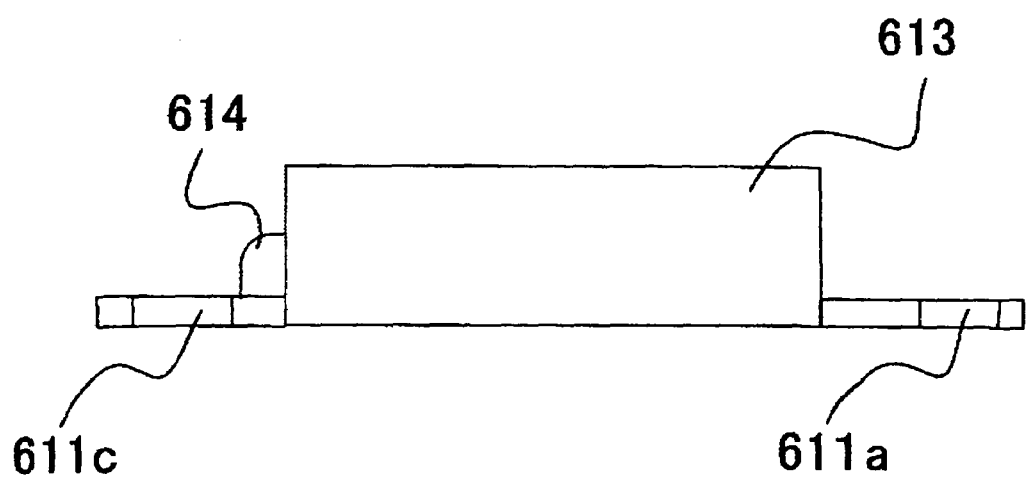
FIG. 11 is a side view seen from the direction of Z3 shown in FIG. 9.
Figure 12:
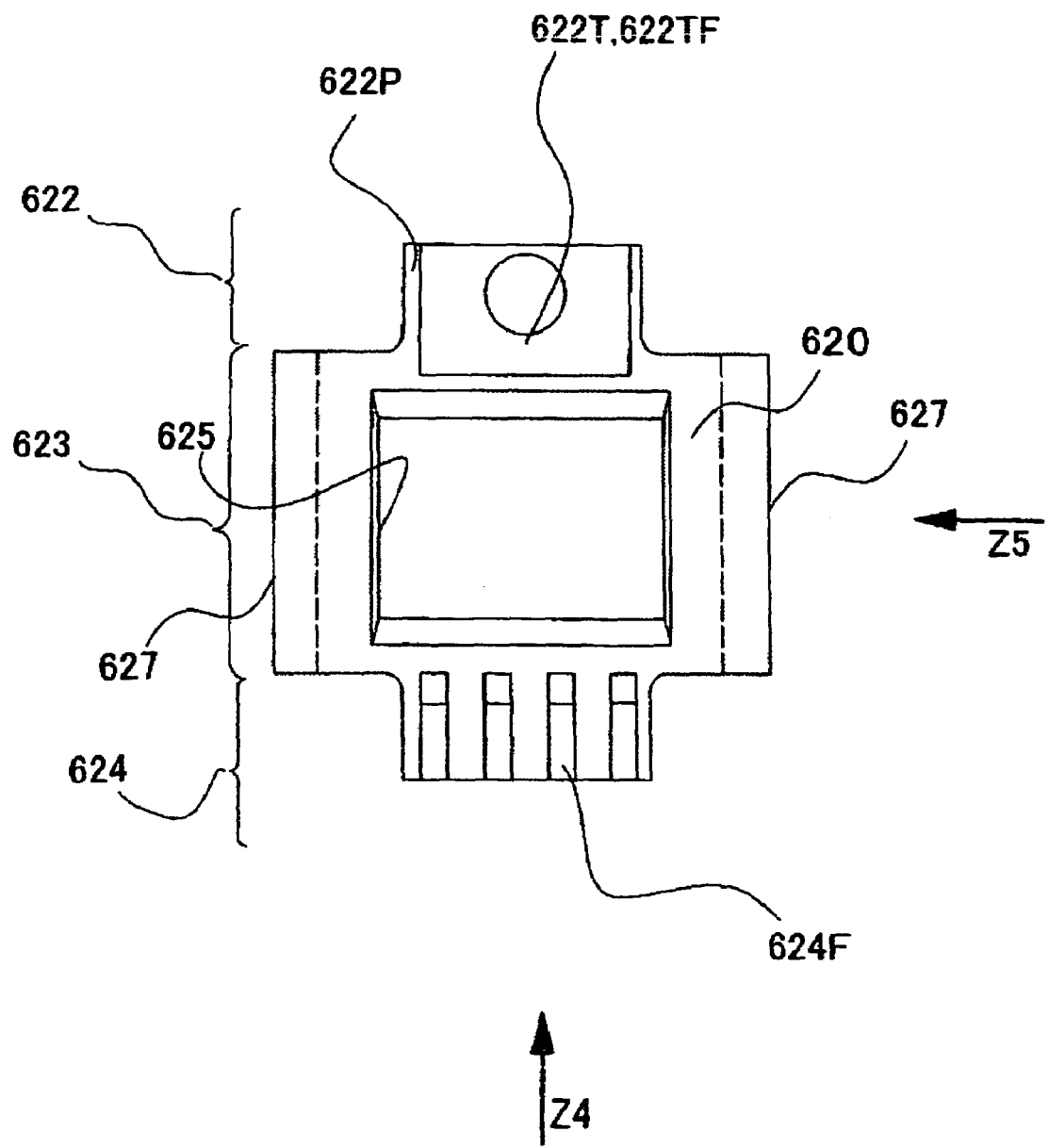
FIG. 12 is a front view of a cover member constituting the mounting case according to the first exemplary embodiment of the present invention.
Figure 13:
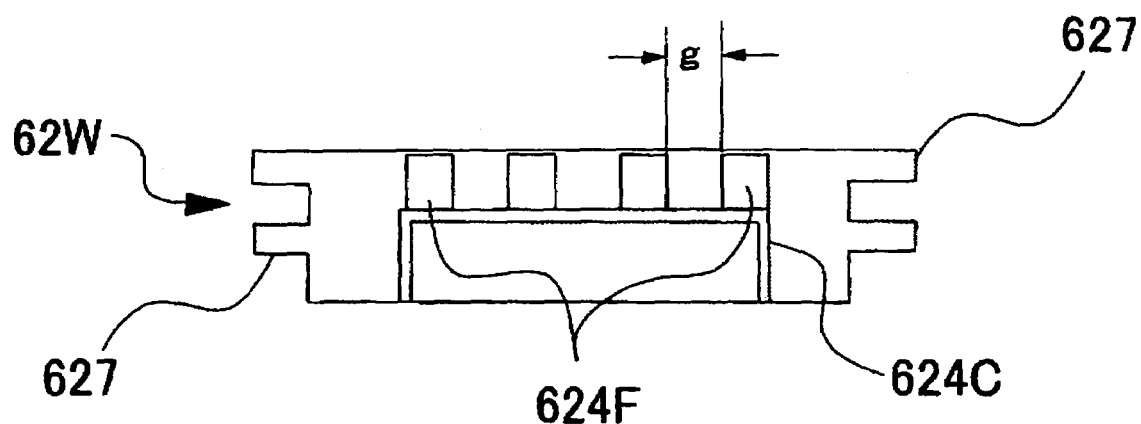
FIG. 13 is a back view seen from the direction of Z4 shown in FIG. 12.
Figure 14:
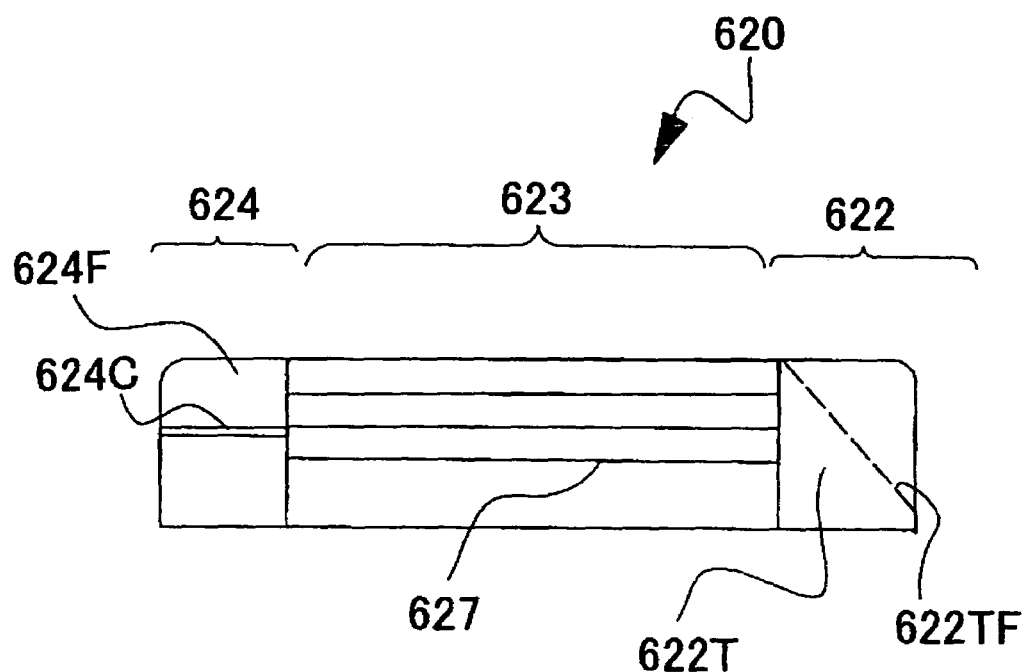
FIG. 14 is a side view seen from the direction of Z5 shown in FIG. 12.

Firstly, the basic construction of a mounting case according to a first exemplary embodiment will be described with reference to FIGS. 4 to 14. Herein, FIG. 4 is an exploded perspective view of a mounting case according to the first exemplary embodiment together with the above-described electro-optical device, FIG. 5 is a front view of the electro-optical device encased in the mounting case, FIG. 6 is a cross-sectional view taken along the plane X1–X1" shown in FIG. 5, FIG. 7 is a cross-sectional view taken along the plane Y1–Y1" shown in FIG. 5, and FIG. 8 is a back view seen from the Z1 direction in FIG. 5. FIGS. 4 to 8 illustrate the mounting case in which the electro-optical device is accommodated. In addition, FIG. 9 is a front view of a plate member constituting the mounting case, FIG. 10 is a back view seen from the Z2 direction in FIG. 9, and FIG. 11 is a side view seen from the Z3 direction in FIG. 9. Furthermore, FIG. 12 is a front view of a cover member constituting the mounting case, FIG. 13 is a back view seen from the Z4 direction in FIG. 12, and FIG. 14 is a side view seen from the Z5 direction in FIG. 12.

As shown in FIGS. 4 to 8, the mounting case 601 includes the plate member 610 and the cover member 620. The electro-optical device 500, which is accommodated in the mounting case 601, includes another optical component, such as a reflection preventing plate overlapped with the surface thereof, and a flexible connector 501 connected to an external circuit connecting terminal, in addition to the electro-optical elements shown in FIGS. 2 and 3. Furthermore, a polarizing plate or a retardation film may be provided in the optical system of the liquid crystal projector 1100, or may be overlapped on the surface of the electro-optical device 500.

Moreover, dustproof substrates 400 are provided on the surfaces of the TFT array substrate 10 and the counter substrate 20 not facing the liquid crystal layers 50 (see FIGS. 4, 6, and 7). The dustproof substrates 400 are constructed to have a predetermined thickness. The dustproof substrates reduce or prevent dirt or dust around the electro-optical device 500 from directly sitting on the surface of the electro-optical device. Therefore, it is possible to effectively remove figures of dirt or dust from appearing on the magnified projection image. This is because the predetermined thickness of the dustproof substrate 400 has a defocusing function to deviate the focus of the source light or the vicinity thereof from a position where dirt or dust exists, that is, from the surface of the dustproof substrate 400.

As shown in FIG. 4, the electro-optical device 500 including the TFT array substrate 10, the counter substrate 20, and the dustproof substrates 400 are accommodated in the mounting case 601 including the plate member 610 and the cover member 620. However, as shown in FIGS. 6 and 7, a molding member 630 is filled between the electro-optical device 500 and the mounting case 601. The molding member 630 ensures the bonding between the electro-optical device 500 and the mounting case 601 and surely reduces or prevents the occurrence of dislocation of the former within the latter.

In the first exemplary embodiment, it is assumed that the light is incident on the cover member 620, passes through the electro-optical device 500, and emits from the plate member 610. That is, referring to the FIG. 1, the component facing the dichroic prism 1112 is not the cover member 620 but the plate member 610.

Now, the construction of the plate member 610 and the cover member 620 constituting the mounting case 601 will be described in more detail.

First, as shown in FIGS. 4 to 11, the plate member 610 has a substantially quadrilateral shape in plan view and is disposed to face one surface of the electro-optical device 500. In the first exemplary embodiment, the plate member 610 and the electro-optical device 500 are directly abutted against each other, and seem as if the latter is mounted on the former.

More specifically, the plate member 610 includes a window 615, a strength reinforcement portion 614, a bent portion 613, a cover member fixing hole 612, and attaching holes 611a to 611d and 611e.

The window 615 is a portion opened in the member having the substantially quadrilateral shape and enables the light to transmit from the upper side to the lower side in FIG. 6, for example. The light passed through the electro-optical device 500 can be emitted through the window 615. Therefore, when the electro-optical device 500 is mounted on the plate member 610, the peripheral region around the image display region 10a of the electro-optical device 500 takes a state as if abutting on the edge of the window 615. In this manner, the plate member 610 holds the electro-optical device 500.

The strength reinforcement portion 614 has a three-dimensional shape formed by a process of convexing a portion of the member having the substantially quadrilateral shape higher than other portions in plan view. This can reinforce the strength of the plate member 610. The strength reinforcement portion 614 is preferably disposed as if to substantially abut against one side of the electro-optical device 500 (see FIG. 7). However, strictly speaking, both of them do not abut against each other in FIG. 7.

The bent portion 613 is a portion formed by bending a portion of each of two opposite sides of the member having the substantially quadrilateral shape toward the inside of the quadrilateral shape. The outer surface of the bent portion 613 is abutted against the inner surface of the cover member 620 when the plate member 610 and the cover member 620 are assembled (see FIG. 6). The inner surface of the bent portion 613 is abutted against the outer surface of the electro-optical device 500 through the molding member 630 (see FIG. 6). As a result, the position of the electro-optical device 500 on the plate member 610 is roughly determined.

In addition, since the inner surface of the bent portion 613 is abutted against the outer surface of the electro-optical device 500 through the molding member 630, the absorption of heat from the former to the latter is available. In other words, the plate member 610 can function as a heat sink for the electro-optical device 500. Thus, it is possible to reduce or prevent the accumulation of heat in the electro-optical device 500 due to the intensive light radiated from the lamp unit 1102 to the electro-optical device 500. In addition, since the outer surface of the bent portion 613 is abutted against the inner surface of the cover member 620 as described above, the heat transfer from the former to the latter is available. In principle, the heat radiation from the electro-optical device 500 is performed by the amount corresponding to heat capacitances of both of the plate member 610 and the cover member 620, so that the cooling of the electro-optical device 500 can be very effectively performed.

The cover member fixing hole portion 612 is a hole portion to engage with a convex portion 621 provided at the corresponding position in the cover member 620. The plate member 610 and the cover member 620 are fixed to each other by engaging the cover member fixing hole portion 612 with the convex portion 621. In addition, in the first exemplary embodiment, the cover member fixing hole portion 612 includes two holes, as shown in each figure. In case of the need of distinguishing the holes, the two holes are referred to as cover member fixing holes 612a and 612b, respectively. Corresponding to the holes, the convex portion 621 includes two convex portions. In case of the need of distinguishing the convex portions, the two convex portions are referred to as convex portions 621a and 621b, respectively.

The attaching holes 611a to 611d are used to attach the electro-optical device encased in the mounting case within the liquid crystal projector 1100, as shown in FIG. 1. In the first exemplary embodiment, the attaching holes 611a to 611d are provided at four corners of the member having the substantially quadrilateral shape. In addition to the attaching holes 611a to 611d, an attaching hole 611e is provided in the first exemplary embodiment. The attaching hole 611e is disposed to form a triangle together with the attaching holes 611c and 611d out of the attaching holes 611a to 611d. In other words, the attaching holes 611e, 611c, and 611d are disposed as the corresponding apexes of the triangle. As a result, in the first exemplary embodiment, it is possible to fix the four points at the four corners using the attaching holes 611a to 611d and to fix the three points at the three corners using the attaching holes 611e, 611c, and 611d.

Next, the cover remember 620, which is a member having a substantially cubical shape, is disposed to face the other surface of the electro-optical device 500, as shown in FIGS. 4 to 8 and 12 to 14.

The cover member 620 is preferably made of light shielding resin, metallic material, and the like in order to reduce or prevent the leakage of the light in the peripheral region of the electro-optical device 500 and the entry of the stray light from the peripheral region to the image display region 10a. Since it is preferable that the cover member 620 functions as a heat sink for the plate member 610 or the electro-optical device 500, the cover member 620 is preferably made of a material of relatively high heat conductivity, such as aluminum, magnesium, copper, or their alloys.

In addition, a convex portion 621 is provided in the cover member 620. As previously described, the convex portion 621 is used to fix the plate member 610, and includes two convex portions 621a and 621b at the positions corresponding to the cover member fixing holes 612a and 612b. The convex portion 621 according to the first exemplary embodiment is provided to form a portion of the cooling air introducing portion 622 or a tapered portion 622T to be described later. Although the convex portion 621 cannot be originally seen in FIG. 5, it is particularly shown in FIG. 5.

More specifically, in this exemplary embodiment, the cover member 620 particularly includes a cooling air introducing portion 622, a cover main body 623, and a cooling air discharging portion 624. In addition, in the first exemplary embodiment, all of the three components 622, 623, and 624 are constructed in a body.

First, as well shown in FIGS. 4, 5, 7, 12, and 14, the cooling air introducing portion 622 includes a tapered portion 622T and a baffle plate 622P which constitute an example of the "cooling air scattering prevention portion" or the "cooling air guiding portion" referred to in an aspect of the present invention.

Figure 15:
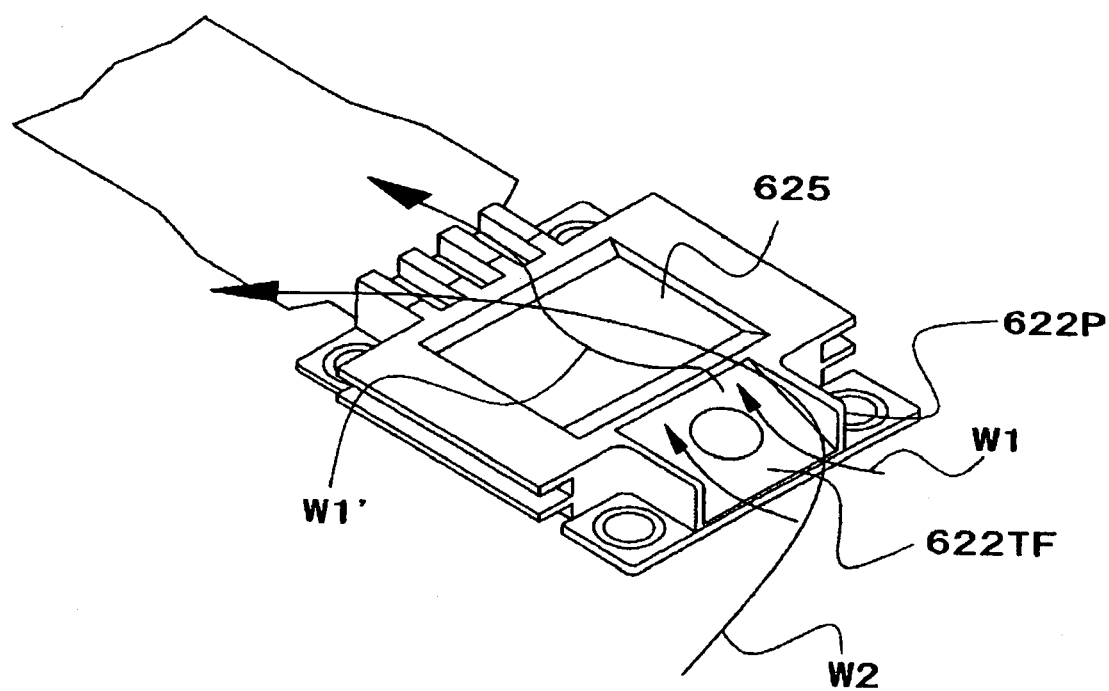
FIG. 15 is a perspective view of the electro-optical device encased in the mounting case according to the first exemplary embodiment of the present invention and illustrates the flow of air with respect to the electro-optical device encased in the mounting case.

In the first exemplary embodiment, the tapered portion 622T which constitutes an example of the "slope portion" referred to in an aspect of the present invention has an appearance similar to a triangular prism having a substantially right-angled triangular bottom. In addition, the tapered portion 622T has an appearance as if one side of the triangular prism is stuck onto the one side of the cover main body 623. In this case, the one side of the triangular prism includes a side interposed between a rectangular portion of the bottom of the triangular prism and a corner portion adjacent thereto. Therefore, the tapered portion 622T includes a base portion 622T1 having a highest height on one side of the cover main body 623. Herein, the term "height" is distance in the longitudinal direction in FIG. 7. In FIG. 7, a broken line extending in this direction is illustrated as an indication. In addition, the tapered portion has a tip 622T2 whose height is gradually reduced from the base portion 622T1. Therefore, it can be said that the tapered portion 622T has such a "pointed shape". In the cover member 620 having the tapered portion 622T of such a pointed shape, the tip 622T2 constituting a portion of the pointed shape is provided to face against the flow of the cooling air. Refer to FIG. 15 and the corresponding description to be described later.

On the other hand, the baffle plate 622P has an appearance similar to a wall erected along one side between two angles except for the rectangular portion on the bottom of the triangular prism. In terms of the aforementioned "height", the height of the baffle plate 622P is constant at any place between the base portion 622T1 and the tip 622T2 although the height of the tapered portion 622T is gradually lowered from the base portion 622T1 to the tip 622T2.

The baffle plate 622P having such a shape is provided to surround one side 622TF of the tapered portion 622T from both sides thereof. (See FIG. 4). The side 622TF is a typical example of a "surface constituting the slope portion" referred in the present invention. Secondly, the cover main body 623, which is a member having a substantially rectangular parallelepiped shape, is interposed between the aforementioned cooling air introducing portion 622 and the cooling air discharging portion 624 to be described later as shown in FIGS. 4 to 8 and FIGS. 12 to 14.

However, the inside of the rectangular parallelepiped shape is in a so-called hollow state in order to accommodate the electro-optical device 500. More strictly speaking, the cover main body 623 is a member having a shape of a box without cover. The "cover" in this expression may be considered to correspond to the plate member 610 described above.

More specifically, the cover main body 623 has a window 625 and a side fin portion 627. The side fin portion 627 corresponds to an example of a "second surface-area increasing portion" or a "fin" referred to in an aspect of the present invention.

The window 625 whose bottom ("top surface" in FIG. 4 or 6) of the box shape is formed in an opened shape is a member allowing light to pass from the upper part to the lower part in FIG. 6. The light emitted from the lamp unit 1102 within the liquid crystal projector 1100 shown in FIG. 1 can be incident to the electro-optical device 500 through the window 625. In addition, the edge of the window 625 has a tapered shape as well, shown in FIG. 7. As a result, the side 622TF of the tapered portion 622T is adapted to be "continuous" with a surface 500F of the electro-optical device 500, which is in the upper position of FIG. 7. In other words, first, the side 622TF is orthogonal to a surface 623F of the cover main body 623, which is in the upper position of FIG. 7, on which the window 625 is provided. Second, the surface 623F is not orthogonal to a surface 625F which constitutes the tapered shape of the edge of window 625. Third, the surface 625F is also not orthogonal to the surface 500F. As a result, there is no step difference among the surfaces 622TF, 623F, 625F, and 500F, and these surfaces are connected "smoothly".

In addition, in the cover main body 623 having the window 625, the peripheral region located near the image display region 10a of the electro-optical device 500 may be formed to abut against the edge of the window 625 similar to the description of the window 615 in the plate member 610. See FIG. 7. By doing so, the cover main body 623, more particularly, the edge of the window 625 can also hold the electro-optical device 500.

In addition, the side fin portions 627 are provided at both sides of the cover main body 623. However, the term "both sides" is the sides except for the sides where the aforementioned cooling air introducing portion 622 and the cooling air discharging portion 624 to be described later are provided. Both the sides (hereinafter, sometimes referred to as a "sidewall portion 62W"), for example, face one side of the electro-optical device 500 and the other side facing the one side, respectively, as shown in FIG. 6, etc. In addition, the inner surface of the sidewall portion 62W is adapted to abut against the outer surface of the bent portion 613 in the plate member 610 when the cover member 620 and the plate member 610 (see FIG. 6) are assembled. In this way, it can be said that the sidewall portion 62W according to the first exemplary embodiment faces the one side and another side of the electro-optical device 500, in particular, through the bent portion 613.

More specifically, the side fin portion 627 has a shape of a plurality of portions straightly protruding from the side in parallel from the cooling air introducing portion 622 to the cooling air discharging portion 624 as shown in FIG. 4 or FIGS. 6 and 13. In the first exemplary embodiment, in particular, two columns of straight fins are disposed in parallel. The presence of the side fin portion 627 leads to the increase of the surface area of the cover main body 623 or the cover member 620. In particular, in the first exemplary embodiment, since the side fin portion 627 is formed on the sidewall portion 62W having a relatively large ratio of occupation with respect to the entire cover member 620, the increase effect of the surface area is more effectively obtained.

The side fin portion 627 having the aforementioned shape may be formed by, for example, a cutting process, a forging process, an injection molding process, or a casting process, at the same time of or after the process of forming the cover member 620. According to these processes, it is possible to easily form the side fin portion 627.

Third, the cooling air discharging portion 624 includes a flexible connector leading portion 624C and a rear fin portion 624F, as shown in FIG. 4, 5, 8, 12, or 13. The flexible connector leading portion 624C is provided on one side of the cooling air discharging portion which faces the side of the cover main body 623 on which the tapered portion 622T is provided. More specifically, as shown in FIG. 8 or 13, a member having a u-shaped cross-section is attached on the aforementioned side with an opened portion of the u-shaped cross-section directed downward in FIG. 8 or 18. A flexible connector 501 connected to the electro-optical device 500 is drawn outside through the U-shaped space.

On the other hand, the rear fin portion 624F which corresponds to an example of the "first surface-area increasing portion" or the "fin" is provided on the so-called ceiling plate of the U-shaped cross-section of the flexible connector drawing portion 624C. More specifically, the rear fin portion 624F has a shape of a plurality of portions straightly protruding from the ceiling plate in parallel to match the direction of straight fins, that is, the side fin portions 627 described above, as shown in FIG. 4, 5, 8, 12, or 13. More specifically, in the first exemplary embodiment, the rear fin portion 624F has "four" straight fins in parallel as shown in the aforementioned figures.

Incidentally, the four fins are provided to follow the flow of the cooling air. Refer to FIG. 15 and the corresponding description. In addition, in the first exemplary embodiment, the gaps g between the four straight fins are 1 mm or more, as shown in FIGS. 8 and 13. By the rear fin portion 624F, the surface area of the cooling air discharging portion 624 or the cover member 620 can be increased.

Incidentally, the rear fin portion 624F having the aforementioned shape may be formed by a process, such as a cutting process, a forging process, an injection molding process, or a casting process, at the same time of or after the process of forming the cover member 620. According to the aforementioned method, the rear fin portion 624F can be relatively easily formed.

In addition, all of the gaps g between the four straight fins constituting the rear fin portion 624F is 1 mm or more, as described above. Namely, for example, in FIG. 15, the leftmost straight fin and the fin at the right thereof are apart from each other 1 mm or more, and the fin at the right thereof are another fin at the right thereof are apart from each other 1 mm or more, and so on. In this case, the "first column of fins" and the "second column of fins", for example, mean the utmost left straight fin and the fin at the right thereof or the fin at the right thereof and another fin at the right thereof. In this way, the "first column of fins" and the "second column of fins" referred to in an aspect of the present invention are generally adopted irrespective of the number of columns of fins actually provided.

Since the cover member 620 has the aforementioned construction, the wind blown from the fan 1300 provided in the liquid crystal projector 1100, as shown in FIG. 1, circulates near the mounting case 601 or the cover member 620, as shown in FIG. 15. Here, FIG. 15 is a perspective view of an electro-optical device encased in a mounting case and illustrates a typical flow of wind in the electro-optical device encased in the mounting case. In order to implement the flow of the cooling air, as shown in FIG. 15, in the liquid crystal projector 1100 shown in FIG. 1, it is necessary to arrange the electro-optical device encased in the mounting case, that is, light valves 100R, 100G, and 100B in such a way that the outlets 100RW, 100GW, and 100BW, described above with reference to FIG. 1, face the cooling air introducing portion 622 constituting the cover member 620.

Figure 16:
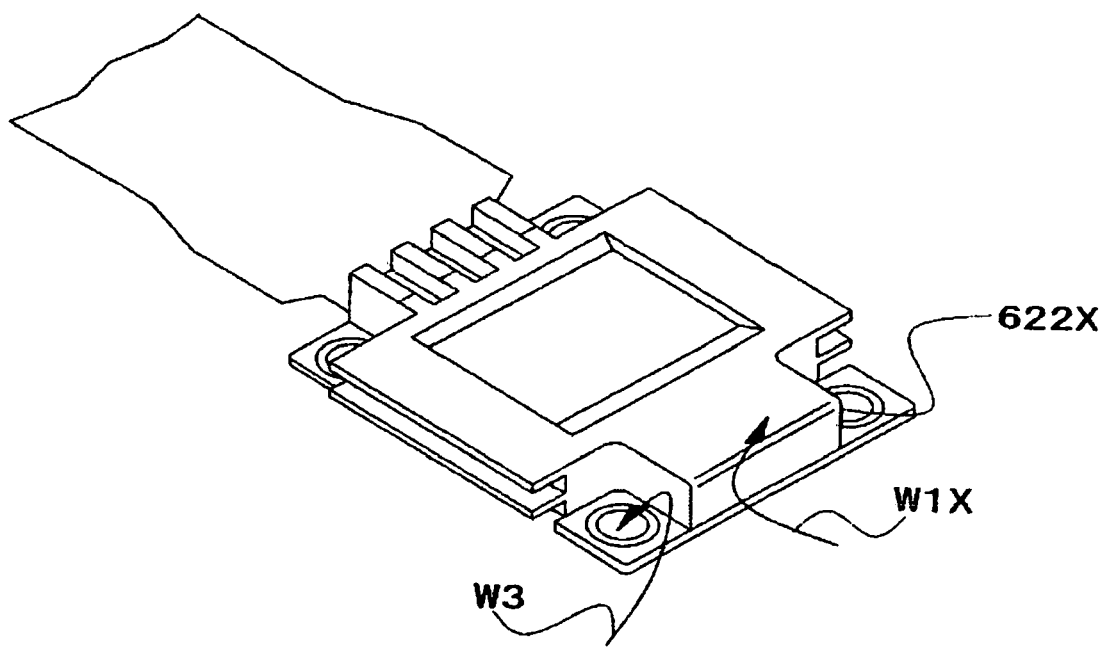
FIG. 16 is a comparative example to FIG. 15.

First, as if the cooling air runs up the tapered portion 622T of the cooling air introducing portion 622, the cooling air is blown to the cover main body 623 where the surface 500F of the electro-optical device 500 is exposed (see reference numeral W1). Here, assuming that the tapered portion 622T or the tip 622T2 constituting the tapered portion is not provided, and, for example, a convex member 622X having a predetermined thickness as shown in FIG. 16 illustrating a comparative example of FIG. 15 is provided in place of the tapered portion, the flow of the cooling air W1X is interrupted by the convex member to a certain extent, and then proceeds along the surface of the convex member 622X. Therefore, it will be difficult that the cooling air W1X proceeds toward the cover main body 623.

As apparent from the comparison, in the first exemplary embodiment, since the cover member 620 includes the tapered portion 622T, it is possible to effectively discharge the cooling air toward the cover main body 623.

In addition, since the baffle plate 622P is provided in the cooling air introducing portion 622, most of the cooling air blown from any direction can be guided on the tapered portion 622T, and thus toward the cover main body 623 (see reference numeral W2 in FIG. 15).

In this way, according to the first exemplary embodiment, since the baffle plate 622P effectively collects the cooling air, it is possible to effectively discharge the air toward the cover main body 623. Particularly in the first exemplary embodiment, the fan 1300, an example of the cooling air discharging portion provided in the liquid crystal projector 1100, supplies a whirlpool wind as already described above (see FIG. 1). Therefore, in the electro-optical device encased in a mounting case, it is probable that the irregular flow of the cooling air W2 relatively frequently occurs, as shown in FIG. 15. Nevertheless, in the first exemplary embodiment, since the baffle plate 622P is provided, the cooling air W2 which is irregularly blown, can be effectively discharged toward the cover main body 623. Furthermore, in the first exemplary embodiment, since the baffle plate 622P is provided so as to surround the side 622TF of the tapered portion 622T on which the cooling air flows up, the discharge of the cooling air toward the cover main body 623 can be more effectively performed.

The cooling air passed through the cooling air introducing portion 622, as described above, then reaches the cover main body 623. Since the cover main body 623 accommodates the electro-optical device 500 therein and the surface 500F of the electro-optical device 500 is exposed externally through the window 625, the cooling air discharged, as described above, can effectively cool down the electro-optical device 500 itself. Still more, particularly in first exemplary embodiment, the edge of the window 625 particularly has a tapered shape, and the surface 500F of the electro-optical device 500 and the side 622TF of the tapered portion 622T are continuous with each other, so that the cooling effect of the electro-optical device 500 can be more effectively enhanced.

In other words, as indicated by the reference numeral W1" in FIG. 15, the cooling air which flows up the side 622TF of the tapered portion 622T is blown almost without interruption toward the surface 623F of the cover main body 623 on which the window 625 is formed and the surface 625F constituting the edge of the window 625 (see FIG. 7), so that the cooling air can flow into the surface 500F of the electro-optical device 500 (see the reference numeral W1" in FIG. 15).

In addition, it should be understood that the cooling air passed through the cooling air introducing portion 622 cools down the cover main body 623 or the cover member 620 as well as the electro-optical device 500 itself, as described above. In addition, particularly in the first exemplary embodiment, since the side fin portion 627 is provided in the cover main body 623, the more effective cooling of the cover main body 623, the cover member 620, or the electro-optical device 500 can be implemented by the effect of the increase of the surface-area.

Next, the cooling air passed through the cover main body 623 reaches the cooling air discharging portion 624. As described above, the rear fin portion 624F is formed in the cooling air discharging portion 624. Since the rear fin portion 624F has the straight fin portion and the surface area of the cooling air discharging portion 624 is increased, as described above, it is possible to effectively cool the cooling air discharging portion 624 and the cover member 620. Furthermore, in the first exemplary embodiment, since the straight fins are provided to follow the flow of the cooling air and the gaps g between the straight fins are 1 mm or more, the following functions and effects can be obtained.

Firstly, since the rear fin portion 624F is provided to follow the flow of the cooling air, the rear fin portion 624F can guide the cooling air smoothly toward subsequent portions without excessively interrupting the flow of the cooling air (see the reference numeral W1" in FIG. 15). Therefore, according to the first exemplary embodiment, the cooling effect of the cover member 620 attributable to the rear fin portion 624F can be effectively obtained.

In addition, as noticeable from the cooing wind W2 in FIG. 15, it is naturally probable that there be a case that the cooling air does not always flow in a direction corresponding to the extending direction of the straight fins. Moreover, the sirocco fan 1300 provided in the liquid crystal projector 1100 supplies a whirlpool wind as already described above (see FIG. 1). Therefore, strictly speaking, the direction of the cooling air is not always limited to the straight direction with respect to the electro-optical device encased in the mounting case which is the light valve 100R 100G, or 100B. However, even in consideration of these situations, the rear fin portion 624F according to the first exemplary embodiment belongs to the case that it is provided "to follow the flow of the cooling air" referred to in an aspect of the present invention. This is because, even in the aforementioned situation, most of the cooling air shown in FIG. 15 can be considered to flow into the cooling air introducing portion 622, the cover main body 623, and cooling air discharging portion 624 in this order.

In this way, the construction that "the fins are provided to follow the flow of the cooling air" does not mean only the case that the fins are provided to strictly or completely follow the flow of the cooling air. As described above, it also includes the case where the fins are provided to roughly follow the direction of the flow of the cooling air with the electro-optical device encased in the mounting case as the center.

On the other hand, since the gaps g between the straight fins constituting the rear fin portion 624F are 1 mm or more, even in a case that the static pressure and amount of the cooling air W1" shown in FIG. 15 are low, the cooling air W1" can be blown between the straight fins uniformly and smoothly. In particular, in the first exemplary embodiment, the electro-optical device encased in the mounting case is provided as the light valves 100R, 100G, or 100B of the liquid crystal projector 1100, as shown in FIG. 1. Therefore, the other components, such as the incident lens 1122 and the relay lens 1123 need to be provided, so that the electro-optical device encased in the mounting case, that is, the light valves 100R, 100G, and 100B, and the fan 1300 have to be disposed with a relatively long distance therebetween. And thus, in some cases, it is difficult to dispose both of them to be completely opposed to each other. In this case, it is considered that only the cooling air having a low static pressure and a low amount are blown to the electro-optical device encased in the mounting case.

Here, in the first exemplary embodiment, since the gaps g between the straight fins are relatively as large as 1 mm or more as described above, the cooling air having the low static pressure and small amount described above can be blown even through the gaps g. By doing so, since the surface area of the fins which is exposed to the cooling air is increased, the characteristics on the heat radiation of the fins can be more enhanced. Therefore, according to the first exemplary embodiment, it is possible to further enhance the heat radiating capability of the overall cover member 620.

In this way, the mounting case 601 according to the first exemplary embodiment, the effective cooling of the electro-optical device 500 itself or the effective cooling of the cover member 620 due to the cooling air, can be implemented as a whole. In addition, such a cooling method is very effective in externally radiating the heat transferred to the electro-optical device 500, the plate member 610, and the cover member 620 in this order as described above. Furthermore, that the cover member 620 can be effectively cooled means that the flow of heat transferred from the electro-optical device 500 through the bent portion 613 or the like to the plate member 610 or the cover member 620 can be effectively maintained at any time. In other words, since the cover member 620 is suitably cooled in a normal state, its function as a heat sink can be maintained at any time, and thus, the heat radiation from the plate member 610, and thus from the electro-optical device 500, can be performed effectively as regards the cover member 620. In addition to this, if the cover member 620 in the first exemplary embodiment is made of a material having a relatively high heat conductivity such as aluminum, magnesium, copper, or their alloys as described above, the aforementioned function and effect will be obviously more effectively enhanced.

Therefore, in the first exemplary embodiment, since the excessive heat is not accumulated in the electro-optical device 500, the deterioration of the liquid crystal layers 50 or the occurrence of the hot spots can be reduced or prevented in advance, so that the deterioration of images due to these cases can be greatly reduced.

Figure 17:
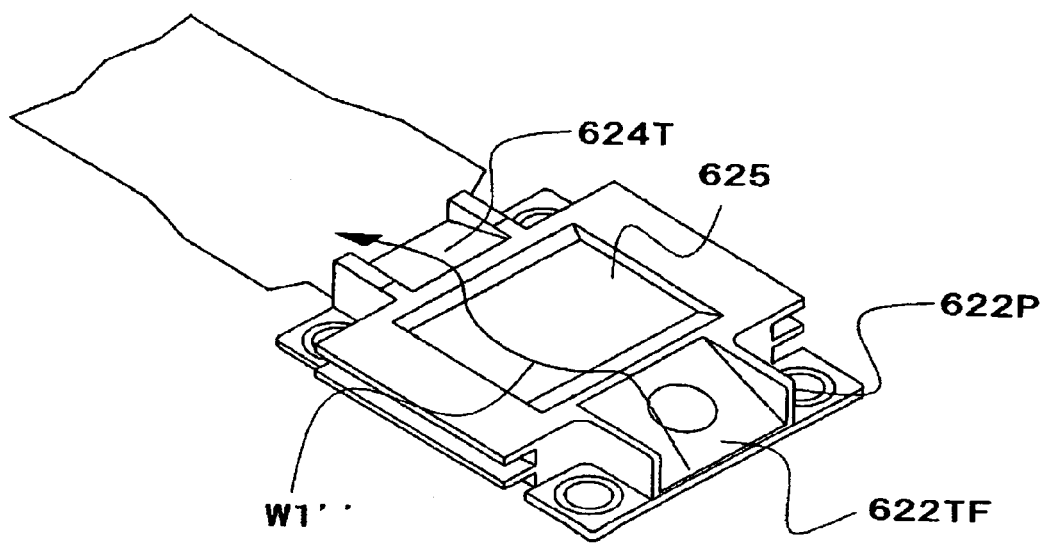
FIG. 17 is a view having the same purpose as FIG. 15 and illustrates an aspect where a rear pin portion is not provided.

In addition, although the rear fin portion 624F is provided in the cooling air discharging portion 624 in the first exemplary embodiment, in an aspect of the present invention, the construction shown in FIG. 17 may be employed in some cases. Here, FIG. 17 is a view having the same purpose as FIG. 15 and illustrates an aspect where a rear pin portion 624F is not provided. In FIG. 17, the rear fin portion 624F is not provided in the cooling air discharging portion 624, and the tapered portion 624T having substantially the same shape as the tapered portion 622T is provided in place thereof. Due to the presence of the tapered portion 624T, the "continuous" state implemented among the side 622TF of the tapered portion 622T, the surface 623F of the cover main body 623, and the surface 625F of the edge of the window 625, as described with reference to FIG. 7 can be also implemented in the cooling air discharging portion 624. Therefore, according to the construction of FIG. 17, the flow of the cooling air blown out from the cover main body 623 to the cooling air discharging portion 624 can be obtained more smoothly than in FIG. 15 (see the reference numeral W1''' in the figure). In this way, in the aspect, since the flow of the cooling air of the entire cover member 620 is implemented without stagnation, the effective cooling of the cover member 620 can be implemented.

However, it can not be simply determined which of the shapes of FIGS. 15 and 17 is better in terms of the cooling efficiency of the cover 620. In other words, as described above, the cooling of the cover member 620 in FIG. 17 can be performed by the smooth flow of the cooling air flowing around the cover member 620 by the tapered portion 624T, whereas the cooling of the cover member 620 in FIG. 15 can be performed by the increase of the entire surface-area of the cover member 620 by the rear fin portion 624F. Since these constructions and functions are complementary, it is difficult to say that one is better than the other. Namely, if the rear fin portion 624F is provided, the smoothness of the flow of the cooling air is scarified, and if the tapered portion 624T is provided, the effect of the increase of the surface-area can not be obtained. In an aspect of the present invention, considering the position of the electro-optical device encased in a mounting case in the liquid crystal projector 1100 or the property of the cooling air, more preferred aspect may be employed.

Figure 18:
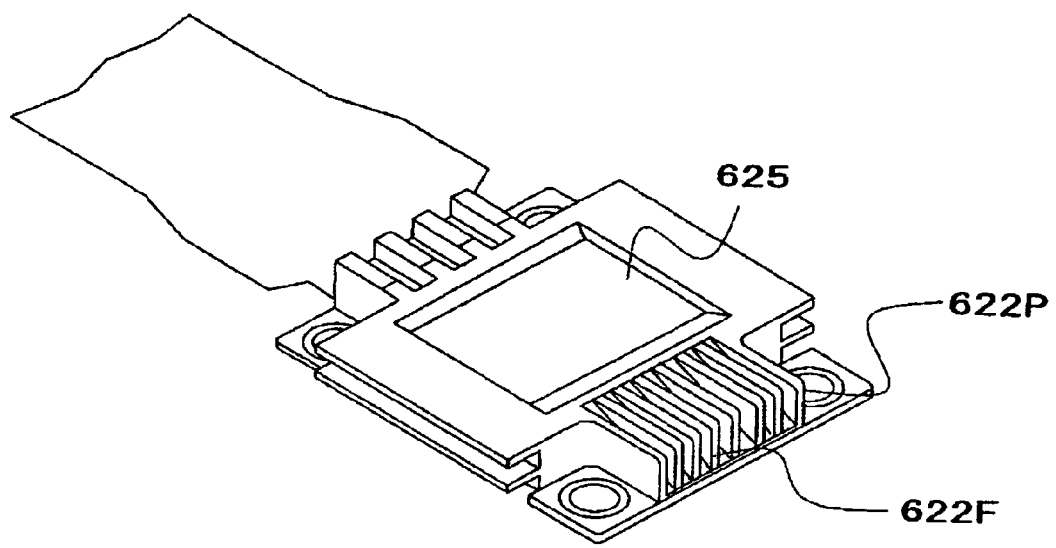
FIG. 18 is a view having the same purpose as FIG. 15 and illustrates an aspect where a front pin portion is provided.

Incidentally, as described above, the relation between the rear fin portion 624F and the tapered portion 624T can be similarly applied to the cooling air introducing portion 622. That is, also in the cooling air introducing portion 622 as shown in FIG. 18, which is a view having the same purpose as FIG. 15, the entire surface-area of the cover member 620 can be increased by providing the front fin portion 622F. By doing so, however, the introducing effect of the cooling air as described above is accordingly reduced. Therefore, even in this case, it cannot be simply determined which one has better construction and function, and thus, after the aforementioned consideration, more preferred aspect may be employed.

Figure 19:
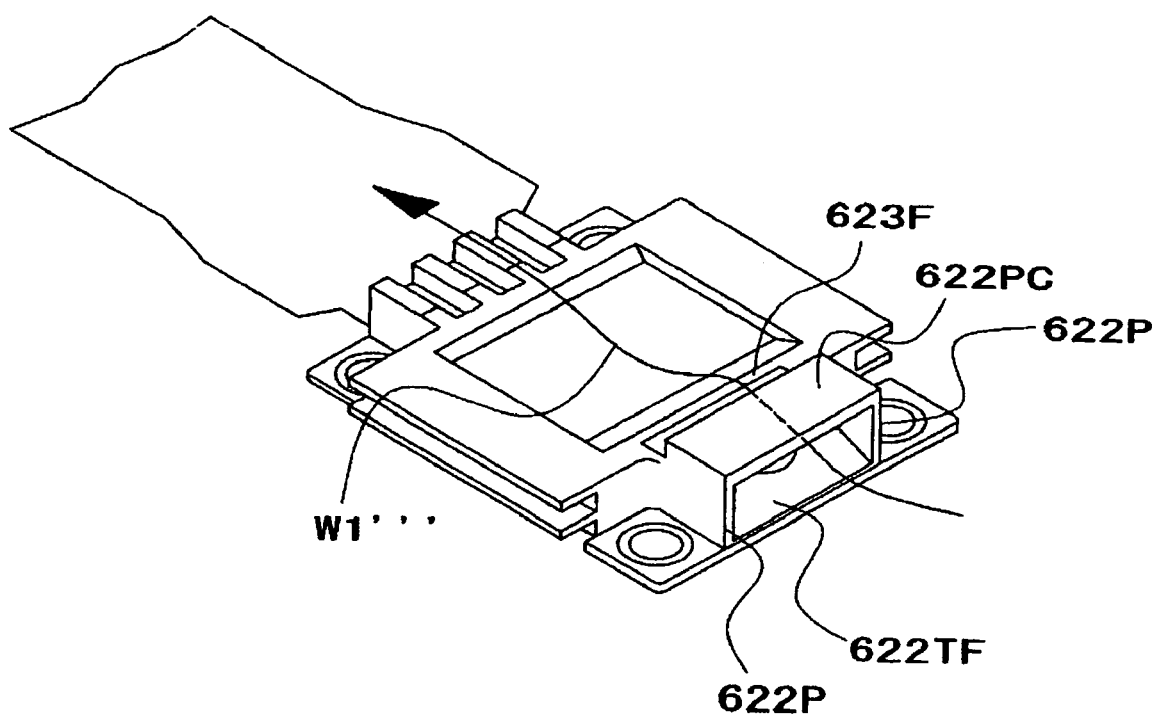
FIG. 19 is a view having the same purpose as FIG. 15 and illustrates a case having a different aspect of a baffle plate.

In addition, although the baffle plates 622P are provided to surround the side 622TF of the tapered portion 622T at both sides thereof in the first exemplary embodiment, the present invention is not limited to this shape. For example, as shown in FIG. 19, which is a view having the same purpose as FIG. 15, another baffle plate 622PC may be provided to span between the baffle plates 622P, which seem as if erected at both sides of the side 622TF. Herein, however, a predetermined gap is provided between the surface 623F of the cover main body 623 on which the window 625 is provided and the lower surface of another baffle plate 622PC. In this case, the side 622TF is completely surrounded by the two baffle plates 622P and 622PC, so that the cooling air can be more effectively discharged into the cover main body 623 (see the reference numeral W1''' in FIG. 19).

An Electro-Optical Device Encased in a Mounting Case

Second Exemplary Embodiment

Figure 20:
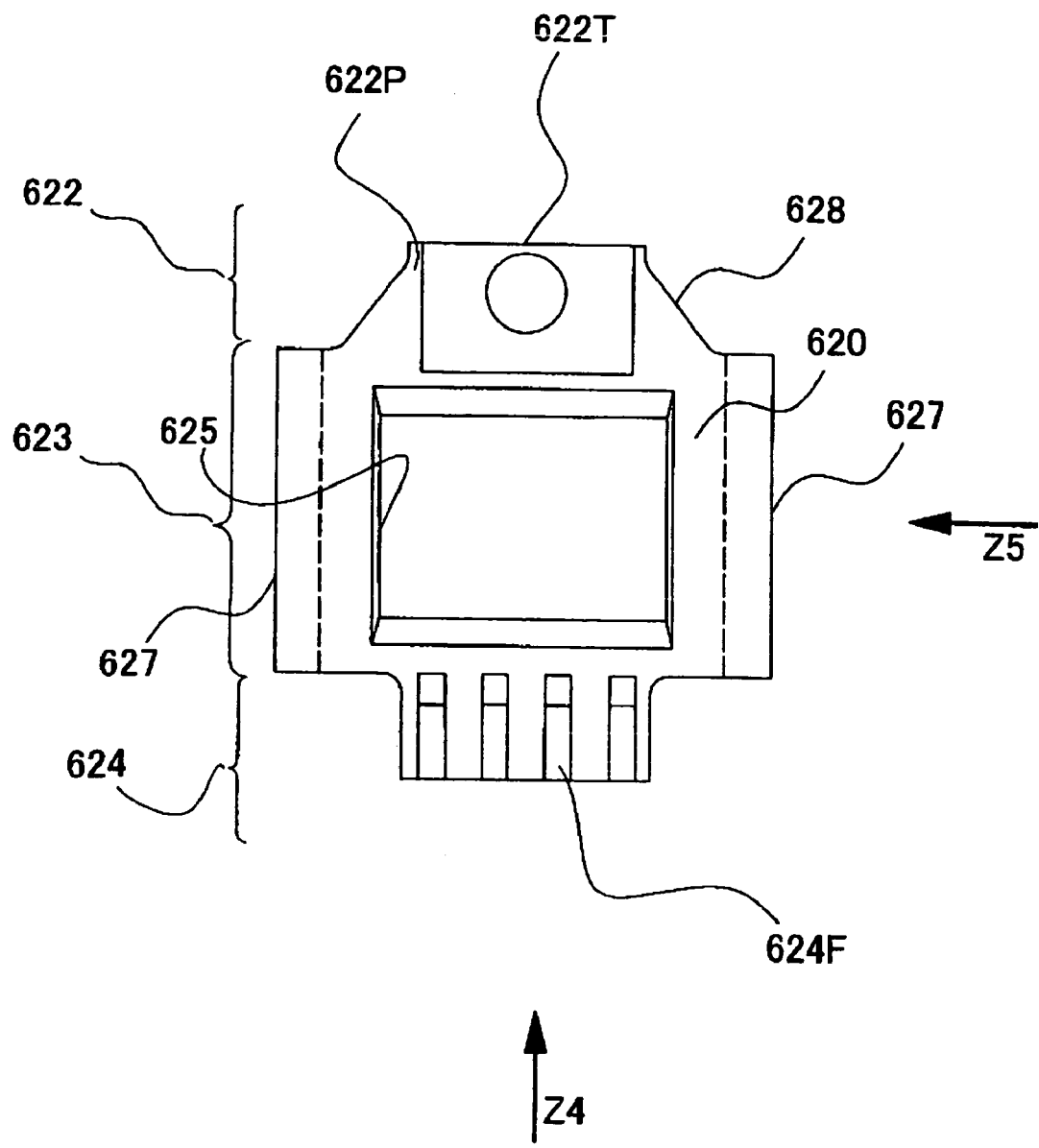
FIG. 20 is a view having the same purpose as FIG. 12 and illustrates a different case in that a baffle portion is provided in a cooling air introducing portion.
Figure 21:
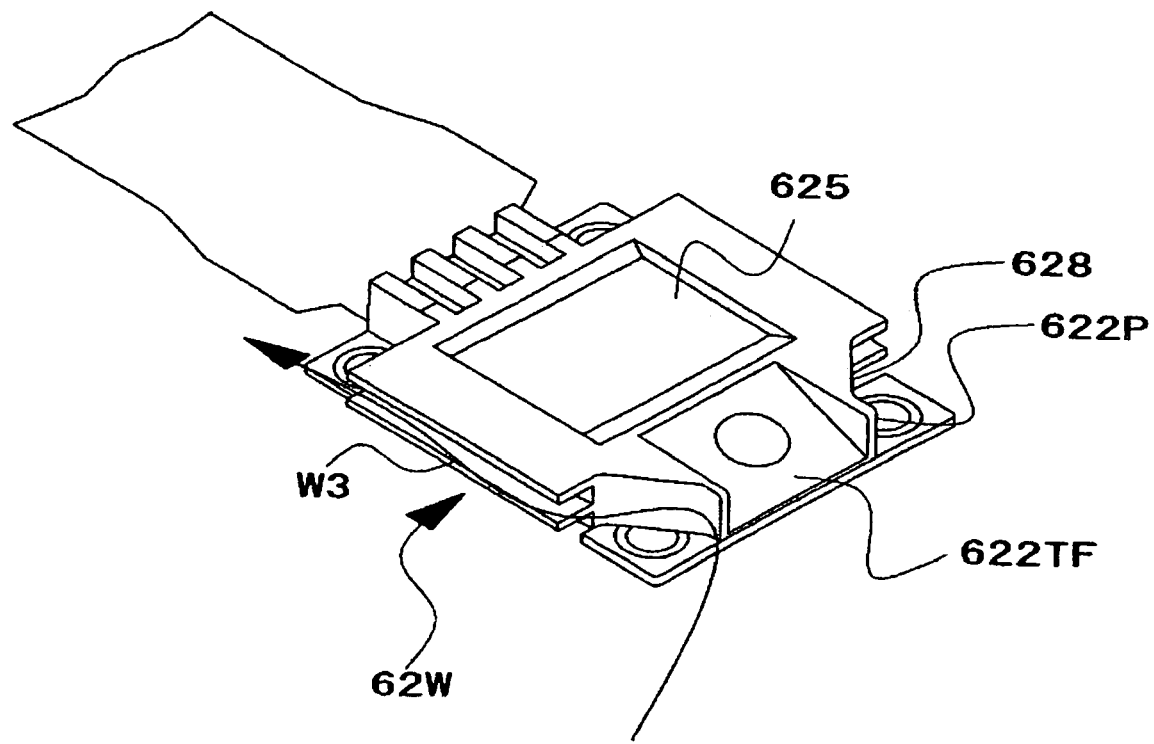
FIG. 21 is a view having the same purpose as FIG. 15 and illustrates a different case in that a baffle portion is provided in a cooling air introducing portion.

Next, an electro-optical device cased in a mounting case according to a second exemplary embodiment will be described with reference to FIGS. 20 and 21. FIGS. 20 and 21 are views having the same purposes as FIGS. 12 and 15, respectively, and illustrate different cases in that a baffle portion is provided in a cooling air introducing portion 622T. In the second exemplary embodiment, the constructions and effects of the main components of the aforementioned "projection display apparatus", "electro-optical device", and the "electro-optical device encased in the mounting case" are the same as those of the first exemplary embodiment. Therefore, their descriptions will be omitted, and only the characteristic parts in the second exemplary embodiment will be described.

In the second exemplary embodiment, the cooling air introducing portion 622T of the cover member 620 includes a baffle portion 628 to blow the cooling air into the side wall portion 62W where the side fin portions 627 are provided. Incidentally, the baffle portion 628 corresponds to an example of the baffle plate 622P, the tapered portion 622T, or the "cooling air scattering prevention portion" referred to in an aspect of the present invention.

Figure 22:
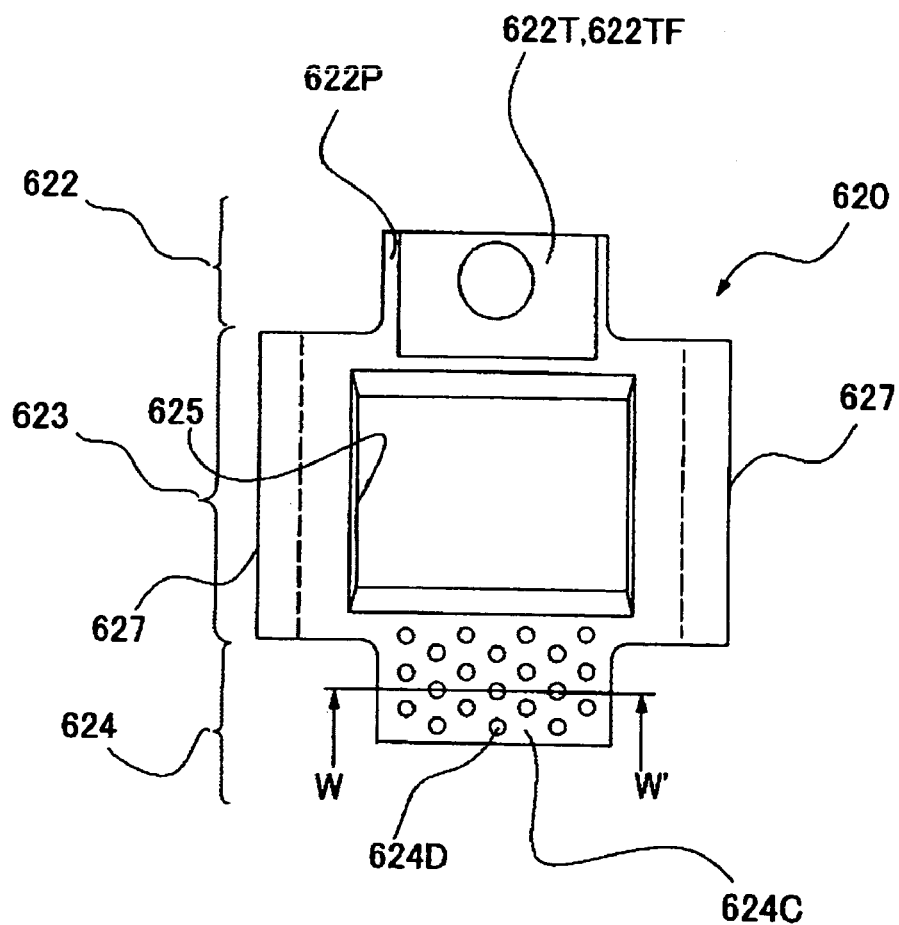
FIG. 22 is a view having the same purpose as FIG. 12 and illustrates a different case in that dimples in place of a rear fin portion are provided in a cooling air discharging portion.

More specifically, the baffle portion 628 has such a configuration that smoothly connects the surface of the baffle plate 622P that does not face the side 622TF of the tapered portion 622T (hereinafter, sometimes referred to as an "outer surface of the baffle plate 622P") and the outer surface of the side wall portion 62W, as shown in FIGS. 21 and 22.

By providing the baffle portion 628 having such a configuration, the following function and effect can be obtained. In other words, in a case that the baffle portion 628 as described above is not provided, the flow of the cooling air blown toward the outer side of the baffle plate 622P is interrupted by the outer surface of the baffle plate 622P, and then directed to the cover main body 623 with difficulties (see the reference numeral W3 in FIG. 16). In the second exemplary embodiment, as shown in FIG. 21, the cooling air W3 blown toward the outer surface of the baffle plate 622P is moved along the baffle portion 628, so that the cooling air can be effectively blown into the side wall portion 62W where the side fin portion 627 is formed. By doing so, the side fin portion 627 can be effectively utilized to exhibit the function and the effect of the side fin portion 627 more effectively. Therefore, the heat radiation capability of the cover member 620 in the second exemplary embodiment is more increased than that in the first exemplary embodiment, or, the cooling effect of the electro-optical device 500 can be more effectively increased.

Incidentally, although only the fin is mentioned as a specific example of the "surface-area increasing portion" referred to in an aspect of the present invention in the aforementioned exemplary embodiments, the present invention is not limited to these aspects. For example, aspects shown in FIGS. 22 and 23 may be employed. Herein, FIG. 22 which is a view having the same purpose as FIG. 12 illustrates an aspect that dimples are provided in the cooling air discharging portion 624, and FIG. 23, which is a cross-sectional view taken at the plane W–W' in FIG. 22, in particular, illustrates only the cross-sectional shapes of dimples.

Figure 23:
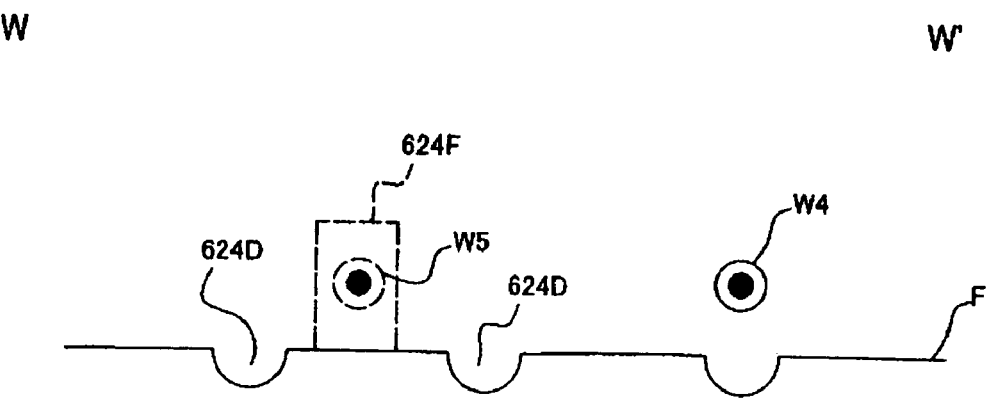
FIG. 23 is a cross-sectional view taken along the plane W–W' shown in FIG. 22 and particularly illustrates only the cross-sectional shapes of the straight fins and the dimples constituting a rear fin portion.

In FIGS. 22 and 23, the dimples 624D in place of the rear fin portion 624F are provided to the cooling air discharging portion 624. The plurality of dimples 624D are provided to cover the ceiling surface of the flexible connector drawing portion 624C.

By the dimples 624D, the surface-area of the cover member 620 can be obviously increased. Therefore, according to the modified aspect, the cooling of the cover member 620 can be implemented as effectively as the first and second exemplary embodiments or further. Thus, the effective cooling of the electro-optical device 500 can be implemented.

It is noted that the difference between the dimples 624D shown in FIGS. 22 and 23 and the aforementioned rear fin portion 624 is whether they are protruded or recessed based on the "surface of the cover" as a reference surface F (see FIG. 23). For example, in FIG. 23, a broken line indicates the cross-section of the fin in case that the fin portion 624 is provided.

Alternatively, the "dimple" referred to in an aspect of the present invention may sometimes have a property that "it never interrupts the flow of the cooling air blown to the electro-optical device cased in the mounting case". The dimples 624D according to the modified exemplary embodiment may have such a property. Namely, as shown in FIG. 23, the dimples 624D never interrupt the flow of the cooling air W4 blown from back to front in the figure. On the other hand, it can be understood from the aforementioned point of view that the straight fin in FIG. 23 does not entirely uninterrupt the flow of the cooling air (particularly, see the cooling air W5 in FIG. 23, However, the cooling air W5 is shielded at the back surface of the paper). Therefore, the difference between "the dimples" and "the fin" may be considered to lie in this point.

In addition, in an aspect of the present invention, the specific shape of the dimple is not limited to a circle as viewed in plane as shown in FIGS. 22 and 23. For example, the shape includes a groove carved along its longitudinal direction.

The present invention is not limited to the aforementioned exemplary embodiments, but it can be modified without departing from the scope and spirit of the present invention obtained by the claims and the teachings of the specification and the accompanying drawings. The modified electro-optical device encased in the mounting cases, projection display apparatuses, and mounting cases also belong to the technical scope of the present invention. The electro-optical device includes an electrophoresis apparatus, an electroluminescence apparatus, a plasma display apparatus, and an apparatus using an electron-emitting device, such as a field emission display apparatus, and a surface-conduction electron-emitter display apparatus as well as a liquid crystal panel.

What is claimed is:

1. An electro-optical apparatus, comprising:
   an electro-optical device having an image display region on which projected light from a light source is incident; and
   a mounting case in which the electro-optical device is encased including a plate disposed to face one surface of the electro-optical device and a cover to accommodate and cover the electro-optical device, the cover having a portion abutting on the plate, the mounting case accommodating the electro-optical device by holding at least a portion of a circumferential region positioned at the periphery of the image display region of the electro-optical device with at least one of the plate and the cover, the cover including:
a main surface with an opening that exposes the image display region of the electro-optical device,
a side surface that intersects the main surface,
a first baffle that directs flow of cooling air toward the opening in the main surface, and
a second baffle that directs flow of cooling air to the side surface.

2. The electro-optical apparatus according to claim 1, the cover further including:
a cooling air scattering prevention portion having a baffle plate.

3. The electro-optical apparatus according to claim 1, the cover further including:
a cooling air introducing portion including a slope portion having a pointed shape whose tip faces a direction against the flow of the cooling air, and
a cooling air scattering prevention portion including the slope portion.

4. The electro-optical apparatus according to claim 3,
a baffle plate being provided so as to surround a surface constituting the slope portion.

5. The electro-optical apparatus according to claim 3, the cover further including:
a cover main body having a window to expose the image display region to the outside, and
a surface of the image display region of the electro-optical device exposed through the window being continuous with the surface constituting the slope portion.

6. The electro-optical apparatus according to claim 1,
the cover further having a cooling air discharging portion to discharge the cooling air which is blown from the cover main body from the cover, and
the cooling air discharging portion having a first surface-area increasing portion to increase the surface-area thereof.

7. The electro-optical apparatus according to claim 1, the cover being made of a material having a high heat conductivity.

8. A projection-type display apparatus, comprising:
an electro-optical device encased in a mounting case according to claim 1;
the light source;
an optical system to guide the projected light into the electro-optical device;
a projection optical system to project the projected light emitted from the electro-optical device; and
a cooling air discharging portion to blow out a cooling air to the electro-optical device encased in the mounting case.

9. An electro-optical apparatus, comprising:
an electro-optical device having an image display region on which projected light from a light source is incident; and
a mounting case in which the electro-optical device is encased including a plate disposed to face one surface of the electro-optical device and a cover to cover the electro-optical device, the cover having a portion abutting on the plate, the mounting case accommodating the electro-optical device by holding at least a portion of a circumferential region positioned at the periphery of the image display region of the electro-optical device with at least one of the plate and the cover,
the cover including a cover main body to accommodate the electro-optical device and a cooling air introducing portion provided to extend from or along the cover main body,
the cooling air introducing portion having a cooling air scattering prevention portion to allow the cooling air, which is blown to the electro-optical device encased in the mounting case, to flow toward the cover main body,
the cooling air introducing portion includes a slope portion having a pointed shape whose tip faces a direction against the flow of the cooling air,
the cooling air scattering prevention portion includes the slope portion,
the cover main body having a window to expose the image display region to the outside,
a surface of the image display region of the electro-optical device exposed through the window being continuous with the surface constituting the slope portion, and
the edge of the window having a tapered shape.

10. An electro-optical apparatus, comprising:
an electro-optical device having an image display region on which projected light from a light source is incident; and
a mounting case in which the electro-optical device is encased including a plate disposed to face one surface of the electro-optical device and a cover to cover the electro-optical device, the cover having a portion abutting on the plate, the mounting case accommodating the electro-optical device by holding at least a portion of a circumferential region positioned at the periphery of the image display region of the electro-optical device with at least one of the plate and the cover,
the cover including a cover main body to accommodate the electro-optical device and a cooling air introducing portion provided to extend from or along the cover main body,
the cooling air introducing portion having a cooling air scattering prevention portion to allow the cooling air, which is blown to the electro-optical device encased in the mounting case, to flow toward the cover main body,
the cover further having a cooling air discharging portion to discharge the cooling air which is blown from the cover main body from the cover,
the cooling air discharging portion having a first surface-area increasing portion to increase the surface-area thereof,
the cover having a side wall portion facing the side of the electro-optical device in the cover main body,
the side wall portion having a second surface-area increasing portion to increase the surface-area thereof, and
at least one of the first surface-area increasing portion and the second surface-area increasing portion including fins provided to protrude from the surface of the cover.

11. The electro-optical apparatus according to claim 10, the fins being provided to follow the flow of the cooling air.

12. The electro-optical apparatus according to claim 10,
the fins including a first column of fins and a second column of fins which extend parallel to the first column of fins, and
a gap between the first column of fins and the second column of fins being 1 mm or more.

13. An electro-optical apparatus comprising:
an electro-optical device having an image display region on which projected light from a light source is incident; and
a mounting case in which the electro-optical device is encased including a plate disposed to face one surface of the electro-optical device and a cover to accommodate and cover the electro-optical device, the cover having a portion abutting on the plate, the mounting case accommodating the electro-optical device by holding at least a portion of a circumferential region positioned at the periphery of the image display region of the electro-optical device with at least one of the plate and the cover, the cover including:

a main surface with an opening that exposes the image display region of the electro-optical device, a side surface that intersects the main surface, a first baffle that directs flow of cooling air toward the opening in the main surface, and a second baffle that directs flow of cooling air to the side surface, and a cooling air introducing portion having a slope portion having a pointed shape.

14. An electro-optical apparatus comprising:

an electro-optical device having an image display region on which projected light from a light source is incident; and a mounting case in which the electro-optical device is encased including a plate disposed to face one surface of the electro-optical device and a cover to accommodate and cover the electro-optical device, the cover having a portion abutting on the plate, the mounting case accommodating the electro-optical device by holding at least a portion of a circumferential region positioned at the periphery of the image display region of the electro-optical device with at least one of the plate and the cover, the cover including:

a main surface with an opening that exposes the image display region of the electro-optical device, a side surface that intersects the main surface, a first baffle that directs flow of cooling air toward the opening in the main surface, and a second baffle that directs flow of cooling air to the side surface, a cooling air introducing portion having a cooling air guiding portion to allow the cooling air, which is blown to the electro-optical device encased in the mounting case, to flow toward the image display region.

15. A mounting case, comprising:

a plate disposed to face one surface of an electro-optical device having an image display region on which projection light from a light source is incident; and a cover to cover the electro-optical device, the cover having a portion abutting on the plate; and the mounting case accommodating the electro-optical device by holding at least a portion of a circumferential region positioned at the periphery of the image display region of the electro-optical device with at least one of the plate and the cover, the cover including:

a main surface with an opening that exposes the image display region of the electro-optical device, a side surface that intersects the main surface, a first baffle that directs flow of cooling air toward the opening in the main surface, and a second baffle that directs flow of cooling air to the side surface.

16. An electro-optical apparatus, comprising:

an electro-optical device having an image display region on which projected light from a light source is incident; and a mounting case in which the electro-optical device is encased including a plate disposed to face one surface of the electro-optical device and a cover to cover the electro-optical device, the cover having a portion abutting on the plate, the mounting case accommodating the electro-optical device by holding at least a portion of a circumferential region positioned at the periphery of the image display region of the electro-optical device with at least one of the plate and the cover, the cover including a cover main body to accommodate the electro-optical device and a cooling air introducing portion provided to extend from or along the cover main body, the cooling air introducing portion having a cooling air scattering prevention portion to allow the cooling air, which is blown to the electro-optical device encased in the mounting case, to flow toward the cover main body, the cover further having a cooling air discharging portion to discharge the cooling air which is blown from the cover main body from the cover, the cooling air discharging portion having a first surface-area increasing portion to increase the surface-area thereof, the cover having a side wall portion facing the side of the electro-optical device in the cover main body, the side wall portion having a second surface-area increasing portion to increase the surface-area thereof, and at least one of the first surface-area increasing portion and the second surface-area increasing portion including dimples provided to form recesses on the surface of the cover.

* * * * *